(12) United States Patent
Yumiki et al.

(10) Patent No.: US 9,094,597 B2
(45) Date of Patent: Jul. 28, 2015

(54) IMAGING APPARATUS AND IMAGING SYSTEM

(75) Inventors: Naoto Yumiki, Osaka (JP); Yoichi Sugino, Osaka (JP); Masahiro Inata, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/484,424

(22) Filed: May 31, 2012

(65) Prior Publication Data

US 2012/0307079 A1    Dec. 6, 2012

(30) Foreign Application Priority Data

Jun. 3, 2011   (JP) .................................. 2011-124827
Apr. 20, 2012  (JP) .................................. 2012-096977

(51) Int. Cl.
  *H04N 5/225*  (2006.01)
  *H04N 5/232*  (2006.01)

(52) U.S. Cl.
  CPC ....... *H04N 5/23203* (2013.01); *H04N 5/23206* (2013.01); *H04N 5/23219* (2013.01)

(58) Field of Classification Search
  USPC ........................... 455/556.1, 557; 348/211.13
  See application file for complete search history.

(56) References Cited

U.S. PATENT DOCUMENTS

| | | | |
|---|---|---|---|
| 6,433,818 B1 * | 8/2002 | Steinberg et al. ............. | 348/161 |
| 7,079,177 B2 | 7/2006 | Okazaki et al. | |
| 7,362,352 B2 | 4/2008 | Ueyama | |
| 7,649,551 B2 | 1/2010 | Ohmura et al. | |
| 2001/0022624 A1 | 9/2001 | Tanaka et al. | |
| 2002/0030746 A1 | 3/2002 | Shibutani | |
| 2003/0202101 A1 * | 10/2003 | Monroe et al. ................. | 348/156 |
| 2005/0096084 A1 * | 5/2005 | Pohja et al. ................. | 455/556.1 |
| 2006/0087568 A1 | 4/2006 | Tanaka et al. | |
| 2006/0290786 A1 * | 12/2006 | Tokai ....................... | 348/211.99 |
| 2008/0088876 A1 | 4/2008 | Tanaka et al. | |
| 2009/0196522 A1 | 8/2009 | Hikida | |
| 2009/0316021 A1 | 12/2009 | Nozaki | |
| 2010/0141778 A1 * | 6/2010 | Basson et al. ............... | 348/207.1 |
| 2010/0149210 A1 * | 6/2010 | Matsunaga et al. ........... | 345/625 |

FOREIGN PATENT DOCUMENTS

| | | |
|---|---|---|
| JP | 10-274797 | 10/1998 |
| JP | 2000-023015 | 1/2000 |
| JP | 2000-152043 | 5/2000 |
| JP | 2001-238118 | 8/2001 |
| JP | 2005-107722 | 4/2004 |
| JP | 2004-201007 | 7/2004 |

(Continued)

*Primary Examiner* — Roberto Velez
*Assistant Examiner* — Stephen Coleman
(74) *Attorney, Agent, or Firm* — Renner, Otto, Boisselle & Sklar, LLP

(57) ABSTRACT

An imaging apparatus includes: an image sensor configured to capture an image of a subject; an identification information storage unit configured to store a particular subject and a terminal device corresponding to the particular subject; a face detection unit and a face recognition unit configured to detect the particular subject stored in the identification information storage unit in the image captured by the image sensor; and a microcomputer configured to notify, when the face detection unit and the face recognition unit detect the particular subject, the terminal device which is stored in the identification information storage unit and corresponds to the detected particular subject that the particular subject is detected.

18 Claims, 17 Drawing Sheets

(56) References Cited

FOREIGN PATENT DOCUMENTS

| JP | 2004-326281 | 11/2004 |
| JP | 2004-343619 | 12/2004 |
| JP | 2006-166408 | 6/2006 |
| JP | 2007-128332 | 5/2007 |
| JP | 2011-035543 | 2/2011 |

* cited by examiner

FIG.1
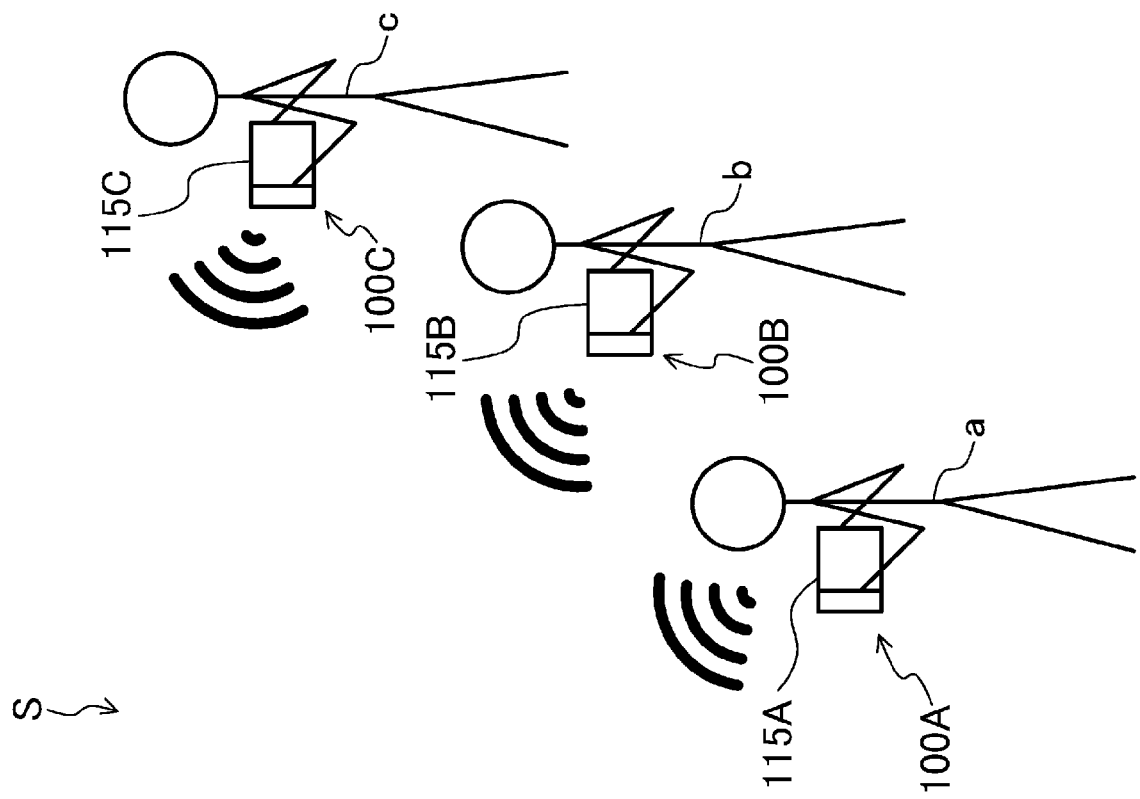
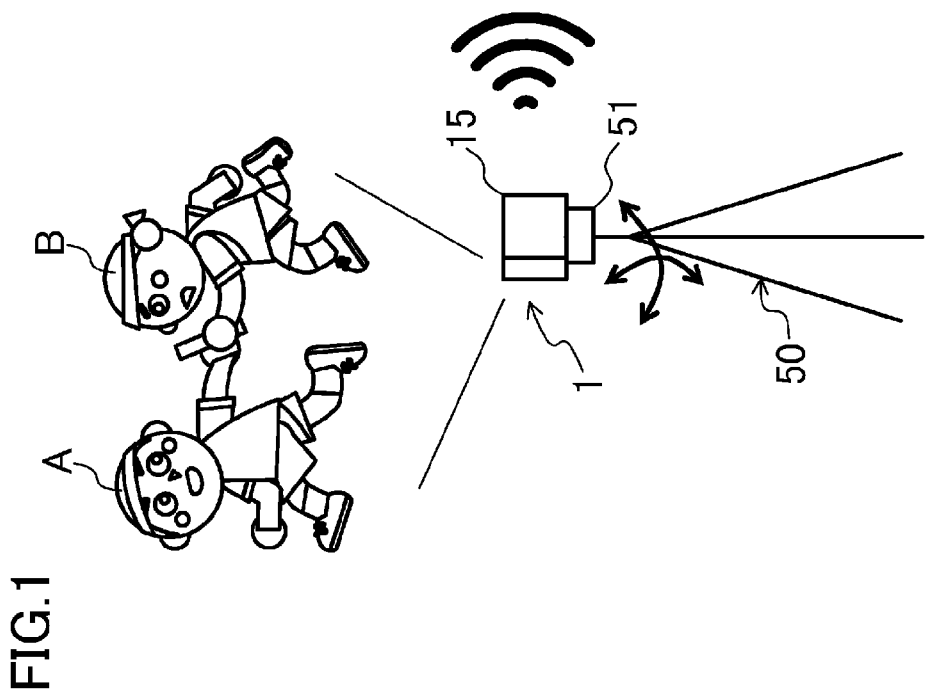

| SUBJECT | TERMINAL DEVICE | 25 |
|---------|-----------------|----|
| A | 100A | |
| B | 100B | |
| C | 100C | |

IMAGING APPARATUS AND IMAGING SYSTEM

CROSS-REFERENCE TO RELATED APPLICATION

This application claims priority to Japanese Patent Application No. 2011-124827 filed on Jun. 3, 2011, and Japanese Patent Application No. 2012-096977 filed on Apr. 20, 2012, the disclosure of which including the specification, the drawings, and the claims is hereby incorporated by reference in its entirety.

BACKGROUND

The disclosed technology relates to an imaging apparatus capable of sending a captured image to a terminal device, and an imaging system including the imaging apparatus.

Imaging apparatuses using an image sensor, such as a CCD and a CMOS, have been known. As communication technologies (wireless LAN etc.) have recently been popularized, imaging apparatuses capable of communicating with other terminal devices have been proposed.

For example, an imaging system disclosed by Japanese Patent Publication No. 2000-023015 includes a single imaging apparatus and a plurality of remote control devices wirelessly connected to the imaging apparatus. The imaging apparatus shoots an image based on control signals from the remote control devices.

In the imaging system of Japanese Patent Publication No. 2000-023015, a plurality of users use the single imaging apparatus. Thus, different from the case where a single user uses a single imaging apparatus, various problems derived from this configuration may occur.

In view of the foregoing, the disclosed technology has been achieved. The disclosed technology is concerned with improving convenience in use of the single imaging apparatus by the plurality of users.

SUMMARY

The disclosed technology is directed to an imaging apparatus which is remote-controllable by a terminal device, and is capable of sending an image to the terminal device, the imaging apparatus including: an imaging unit configured to capture an image of a subject; a storage unit configured to store one or multiple particular subjects, and one or multiple terminal devices corresponding to the one or multiple particular subjects; a detection unit configured to detect the particular subject stored in the storage unit in the image captured by the imaging unit; and a control unit configured to notify, when the detection unit detects the particular subject, the terminal device which is stored in the storage unit and corresponds to the detected particular subject that the particular subject is detected.

The disclosed technology is also directed to an imaging system including a terminal device; and an imaging apparatus which is remote-controllable by the terminal device, and is capable of sending an image to the terminal device, wherein the imaging apparatus includes: an imaging unit configured to capture an image of a subject; a storage unit configured to store one or multiple particular subjects, and one or multiple terminal devices corresponding to the one or multiple particular subjects; a detection unit configured to detect the particular subject stored in the storage unit in the image captured by the imaging unit; and a control unit configured to notify, when the detection unit detects the particular subject, the terminal device which is stored in the storage unit and corresponds to the detected particular subject that the particular subject is detected.

BRIEF DESCRIPTION OF THE DRAWINGS

FIG. 1 shows a schematic configuration of an imaging system of a first embodiment.

DETAILED DESCRIPTION

An example embodiment will be described in detail with reference to the drawings.

First Embodiment (1. General Configuration of Imaging System)

FIG. 1 shows a schematic configuration of an imaging system of a first embodiment.

An imaging system S includes an imaging apparatus 1 and three terminal devices 100A, 100B, and 100C. The imaging apparatus 1 is mounted on a tripod 50 having an electric pan head 51 in which a motor is mounted. The terminal devices 100A, 100B, and 100C are operated by users a, b, and c, respectively. The imaging apparatus 1 and the terminal devices 100A, 100B, and 100C are wirelessly connected so that signals can be transmitted between them. For example, each of the terminal devices 100A, 100B, and 100C can send a control signal to the imaging apparatus 1 to allow the imaging apparatus 1 to perform shooting. The imaging apparatus 1 can send an image and additional information to the terminal devices 100A, 100B, and 100C. The tripod 50 is wirelessly connected to the terminal devices 100A, 100B, and 100C or the imaging apparatus 1 so that signals can be transmitted between them. For example, the terminal devices 100A, 100B, and 100C can send a control signal directly or indirectly through the imaging apparatus 1 to the tripod 50 to pan or tilt the electric pan head 51. The terminal devices 100A, 100B, and 100C may be referred to as terminal device(s) 100 when distinction among them is not necessary.

(2. Configuration of Imaging Apparatus)

Figure 2:
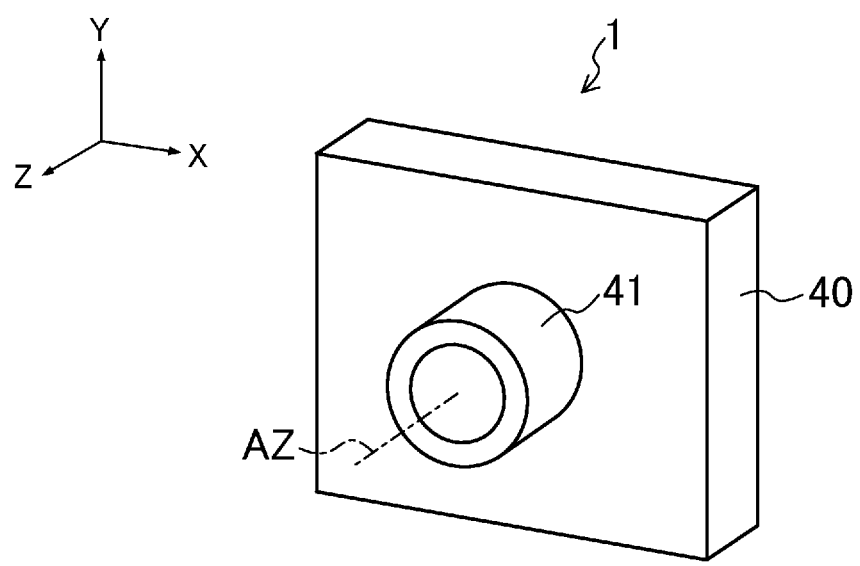
FIG. 2 is a perspective view of an imaging apparatus.
Figure 3:
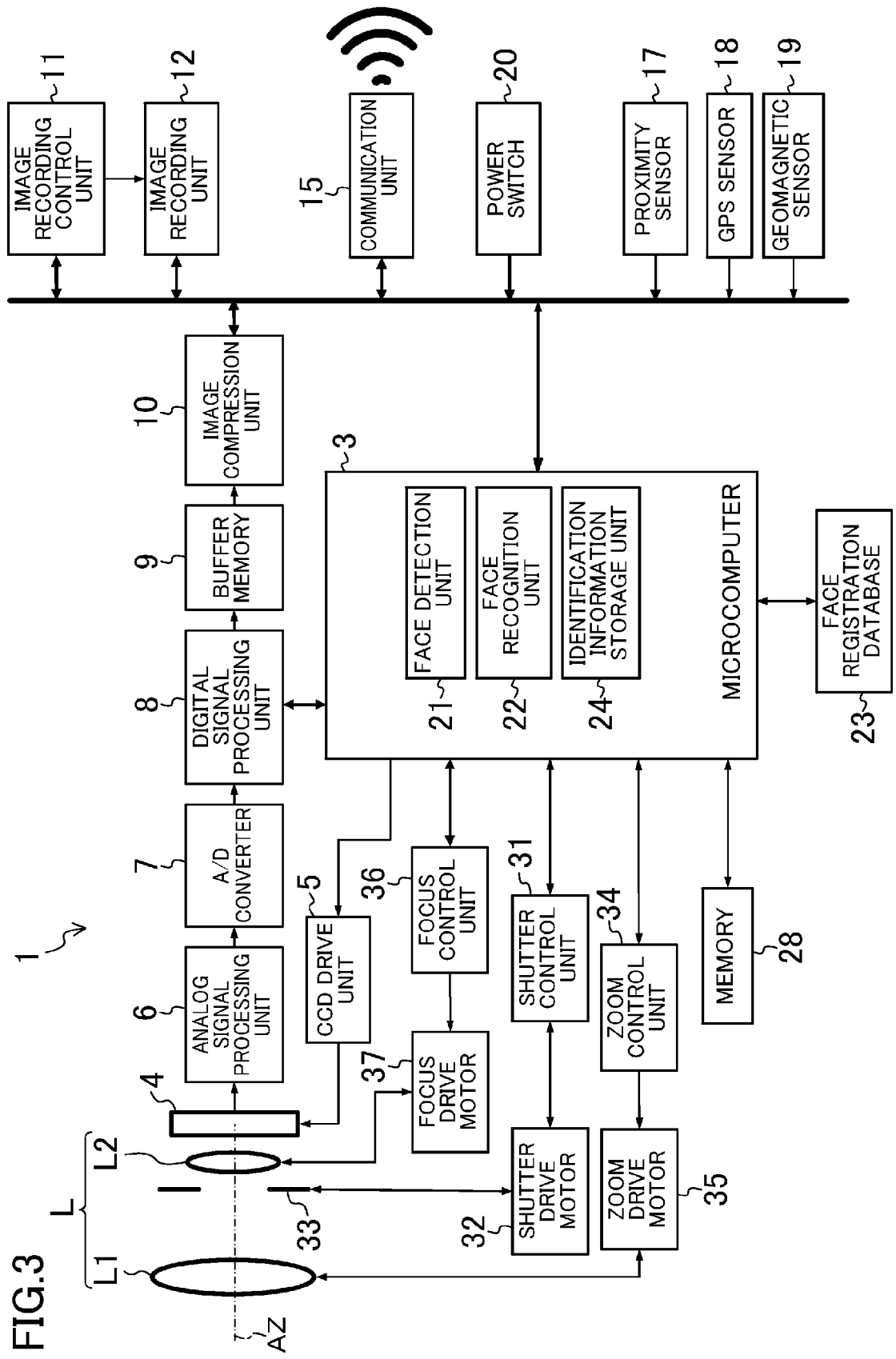
FIG. 3 is a block diagram showing a schematic configuration of the imaging apparatus.

FIG. 2 is a perspective view of the imaging apparatus 1, and FIG. 3 is a block diagram showing a schematic configuration of the imaging apparatus 1. For easy description, three-dimensional rectangular coordinates are defined in which an optical axis AZ of the imaging apparatus 1 is referred to as a Z axis (a direction toward a subject is a positive direction, and a direction toward an imaging surface is a negative direction), a horizontal direction of the imaging apparatus 1 is referred to as an X axis, and a vertical direction of the imaging apparatus 1 is referred to as an Y axis as shown in FIG. 2.

The imaging apparatus 1 may be a digital camera. The imaging apparatus 1 includes a camera body 40 and a lens barrel 41 as shown in FIG. 2. The imaging apparatus 1 further includes an optical system L, a microcomputer 3, an image sensor 4, a CCD drive unit 5, an analog signal processing unit 6, an A/D converter 7, a digital signal processing unit 8, a buffer memory 9, an image compression unit 10, an image recording control unit 11, an image recording unit 12, a communication unit 15, a power switch 20, a proximity sensor 17, a GPS sensor 18, a geomagnetic sensor 19, a face registration database 23, a memory 28, a shutter 33, a shutter control unit 31, a shutter drive motor 32, a zoom control unit 34, a zoom drive motor 35, a focus control unit 36, and a focus drive motor 37 as shown in FIG. 3.

The optical system L forms an optical image of a subject, and includes a zoom lens group L1, a focus lens group L2, etc. The optical system L is supported by the lens barrel 41.

The microcomputer 3 generally controls the imaging apparatus 1. The microcomputer 3 is connected to the various units.

The shutter 33 is arranged on the optical axis AZ and between the zoom lens group L1 and the focus lens group L2. The shutter drive motor 32 drives the shutter 33. The shutter control unit 31 controls the shutter drive motor 32 based on a control signal from the microcomputer 3 to operate the shutter 33. For example, the microcomputer 3 generates a control signal to be sent to the shutter control unit 31 when the microcomputer 3 receives a control signal derived from operation of a shutter button 134 of the terminal device 100 described later.

The zoom drive motor 35 moves the zoom lens group L1 along the optical axis AZ. The zoom control unit 34 controls the zoom drive motor 35 based on a control signal from the microcomputer 3. Specifically, the microcomputer 3 outputs the control signal to the zoom control unit 34 so that the zoom lens group L1 performs zooming. For example, the microcomputer 3 generates the control signal to be sent to the zoom control unit 34 when the microcomputer 3 receives a control signal derived from operation of a zoom button 137 of the terminal device 100 described later.

The focus drive motor 37 moves the focus lens group L2 along the optical axis AZ. The focus control unit 36 controls the focus drive motor 37 based on a control signal from the microcomputer 3. Specifically, the microcomputer 3 outputs the control signal to the focus control unit 36 to perform focusing. For example, the microcomputer 3 generates the control signal to be sent to the focus control unit 36 when the microcomputer 3 receives a control signal derived from operation of the shutter button 134 of the terminal device 100 described later.

The image sensor 4 may be a CCD, for example. The image sensor 4 converts the optical image formed by the optical system L into an electric image signal. The image sensor 4 is controlled by the CCD drive unit 5. The CCD drive unit 5 is controlled by a control signal from the microcomputer 3. The image sensor 4 may be an electronic component which performs photoelectric conversion, such as a CMOS sensor. The image sensor 4 is an example of an imaging unit.

The image signal output from the image sensor 4 is sequentially processed by the analog signal processing unit 6, the A/D converter 7, the digital signal processing unit 8, the buffer memory 9, and the image compression unit 10. The analog signal processing unit 6 performs analog signal processing, such as gamma processing, on the image signal output from the image sensor 4. The A/D converter 7 converts the analog signal output from the analog signal processing unit 6 to a digital signal. The digital signal processing unit 8 performs digital signal processing, such as noise reduction, edge enhancement, etc., on the image signal converted to the digital signal by the A/D converter 7. The buffer memory 9 is a random access memory (RAM), and temporarily stores the image signal processed by the digital signal processing unit 8. The image compression unit 10 compresses data of the image signal stored in the buffer memory 9. Thus, a data size of the image signal is reduced to be smaller than the original data. For example, a still image may be compressed by Joint Photographic Experts Group (JPEG), and a moving image may be compressed by Moving Picture Experts Group (MPEG).

Based on a command from the image recording control unit 11, the image recording unit 12 stores the image signal (a moving image and a still image) in association with a signal of a reduced image corresponding to the image signal and predetermined information. The predetermined information associated with the image signal may include, for example, date information when the image is shot, focal length information, shutter speed information, f/number information, shooting mode information, etc. The predetermined information may be a format similar to Exif®, for example. The predetermined information may include face recognition information described later.

The communication unit 15 establishes wireless communication with the terminal device 100 through, for example, wireless LAN. For example, the communication unit 15 is Wi-Fi®-certified, and is Wi-Fi®-connected to the terminal devices 100. The imaging apparatus 1 and the terminal device 100 may be connected via an external communication device, such as an access point, or may directly be connected via P2P (a wireless ad hoc network) without using any external communication device. Alternatively, a telecommunication standard for cellular phones, such as 3G, or Long Term Evolution (LTE), may be used. For example, the communication unit 15 can receive a control signal etc. from the terminal device 100, and can send an image signal etc. to the terminal device 100 through wireless communication.

The proximity sensor 17 detects that the imaging apparatus 1 is in proximity to the terminal device 100. For example, the proximity sensor 17 may be a magnetic sensor, such as a Hall device. The GPS sensor 18 determines a location of the imaging apparatus 1. The GPS sensor 18 determines a latitude/longitude, or a location where a representative landmark exists. The geomagnetic sensor 19 determines a direction pointed by the lens barrel 41 (the optical axis AZ) of the imaging apparatus 1.

The power switch 20 is a switch operated to turn on/off the imaging apparatus 1.

The face registration database 23 has a face recognition table. The face recognition table stores a plurality of face recognition records which are data related to faces of particular persons. Each of the face recognition records contains data related to facial features.

The microcomputer 3 includes a face detection unit 21, a face recognition unit 22, and an identification information storage unit 24.

The face detection unit 21 performs face detection. Specifically, the face detection unit 21 detects a face of a subject from a single frame of an image obtained from the digital signal processing unit 8. The face detection can be performed by extracting an outline from the image, and detecting whether features (eyes, nose, mouth, etc.) are found in the extracted outline. When the features are found in the detected outline, the face detection unit 21 determines the outline as a face. The microcomputer 3 sets a distance measurement frame F (an AF frame) surrounding the detected face of the subject. The distance measurement frame F may be set on the eyes, nose, or mouth of the subject instead of the face of the subject. Further, the face detection unit 21 extracts facial feature data, and determines sex and age of the subject, or determines whether the subject is a person or an animal based on the features. The face detection unit 21 detects a plurality of faces, if they are in the single frame, and extracts the facial feature data of each face.

Figures 4, 5:
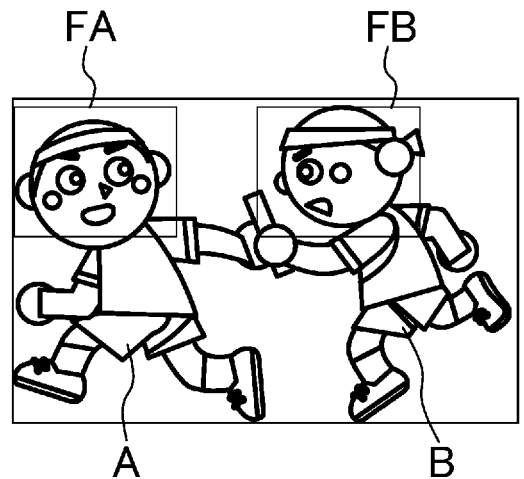
FIG. 4 shows an example of a distance measurement frame F set on a subject.
FIG. 5 shows an identification information table.

FIG. 4 shows an example of the distance measurement frame F set on the subject. In FIG. 4, the distance measurement frame FA is set on a region where the face detection is performed on a subject A. A distance measurement frame FB is set on a region where the face detection is performed on a subject B.

The face recognition unit 22 compares the facial feature data extracted by the face detection unit 21 with the feature data stored in the face registration database 23 to determine similarity. The face recognition unit 22 determines which person's face is the detected face based on the similarity, thereby determining the subject. The face detection unit 21 and the face recognition unit 22 are examples of a detection unit.

The identification information storage unit 24 stores an identification information table 25 shown in FIG. 5. The identification information table 25 stores particular subjects associated with the terminal devices. Specifically, in the identification information table 25, the particular subjects and the corresponding terminal devices 100 are associated, respectively. Pieces of identification information unique to the terminal devices are stored in the columns of the terminal devices 100A, 100B, and 100C in FIG. 5. In this example, the identification information is a Wi-Fi® address of each of the terminal devices 100. Image data of each of the subjects are stored in the columns of the subjects A, B, and C in FIG. 5. Specifically, the subject A is associated with the terminal device 100A, the subject B is associated with the terminal device 100B, and the subject C is associated with the terminal device 100C. The identification information storage unit 24 is an example of a storage unit.

The identification information table 25 can be set by a user. Specifically, the user registers the identification information unique to each of the terminal devices 100 in the imaging apparatus 1. For example, the imaging apparatus 1 displays all the terminal devices 100 which can be Wi-Fi®-connected so that the user can select one of the terminal devices 100 to be registered. An address of wireless LAN, a mail address, or a phone number of each terminal device 100 can be registered as the unique identification information. Then, the user selects a face of a person in an image shot by the imaging apparatus 1. The imaging apparatus 1 displays the shot image on a liquid crystal display (not shown) to encourage the user to select the person to be registered. Then, the user allocates the registered identification information of the terminal device 100 to the selected face. Thus, the user can set the identification information table 25. The registered face may be a face of the user who possesses the terminal device 100, or a face of a person except for the user, such as a user's family member.

The microcomputer 3 generally controls the imaging apparatus 1, e.g., performs the shooting, or transmits and receives signals to and from external devices. One of the controls performed by the microcomputer 3 is focusing. The microcomputer 3 performs the focusing based on a contrast value of the distance measurement frame. The microcomputer 3 outputs a control signal to the focus control unit 36 to move the focus lens group L2 along the optical axis AZ, while calculating a contrast value. The contrast value is calculated by arithmetic processing of the image signal corresponding to the distance measurement frame FA or the distance measurement frame FB. The microcomputer 3 obtains a position of the focus lens group L2 at which the highest contrast value of the distance measurement frame FA, FB is obtained. Then, the microcomputer 3 calculates an optimum focus position relative to the subject (the position of the focus lens group L2) based on the magnitude of the contrast value of the distance measurement frame FA, FB, weighting based on the position of the distance measurement frame FA, FB on the screen, etc.

The imaging apparatus 1 configured as described above displays a through image captured by the image sensor 4 on the liquid crystal display (live view display). The imaging apparatus 1 performs the shooting when the user operates a release button (not shown). The imaging apparatus 1 displays the shot image on the liquid crystal display, or stores the shot image in the image recording unit 12. The "through image" designates an image captured by the image sensor 4, i.e., a through-the-lens image, and is used for the shooting. The "shot image" designates an image shot by the imaging apparatus 1. Specifically, the "shot image" is an image which is captured by the image sensor 4, and processed as a single file. Both of the "through image" and the "shot image" are images captured by the image sensor 4, i.e., they are "captured images."

(3. Configuration of Terminal Device)

Figure 6:
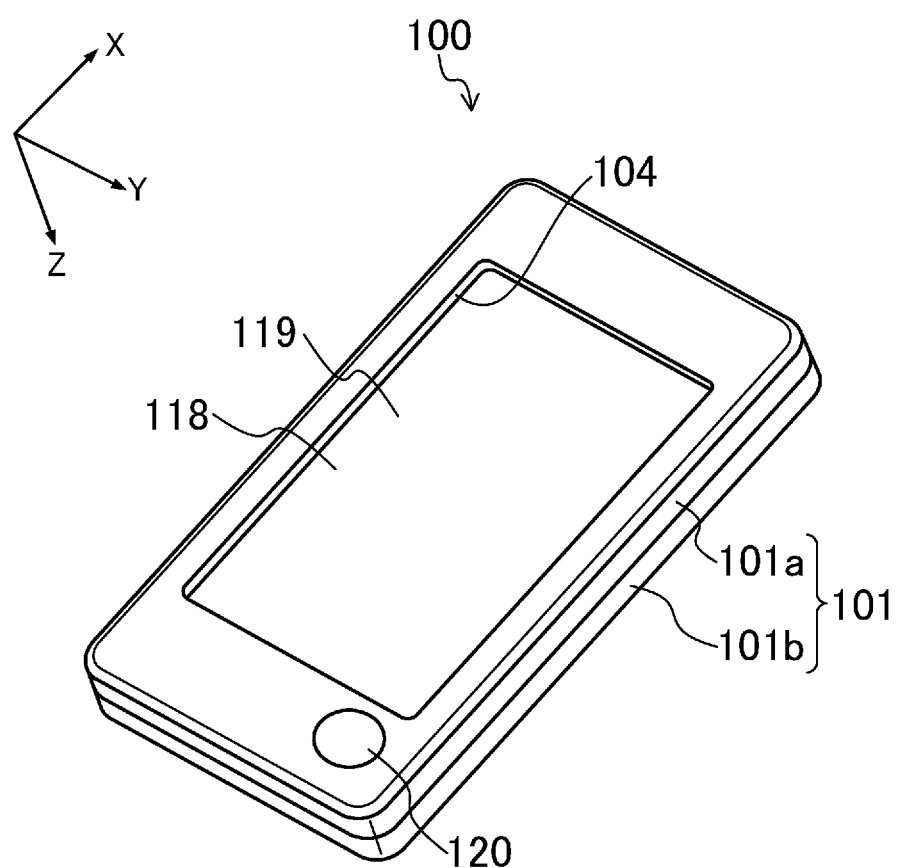
FIG. 6 is a perspective view of a terminal device.
Figure 7:
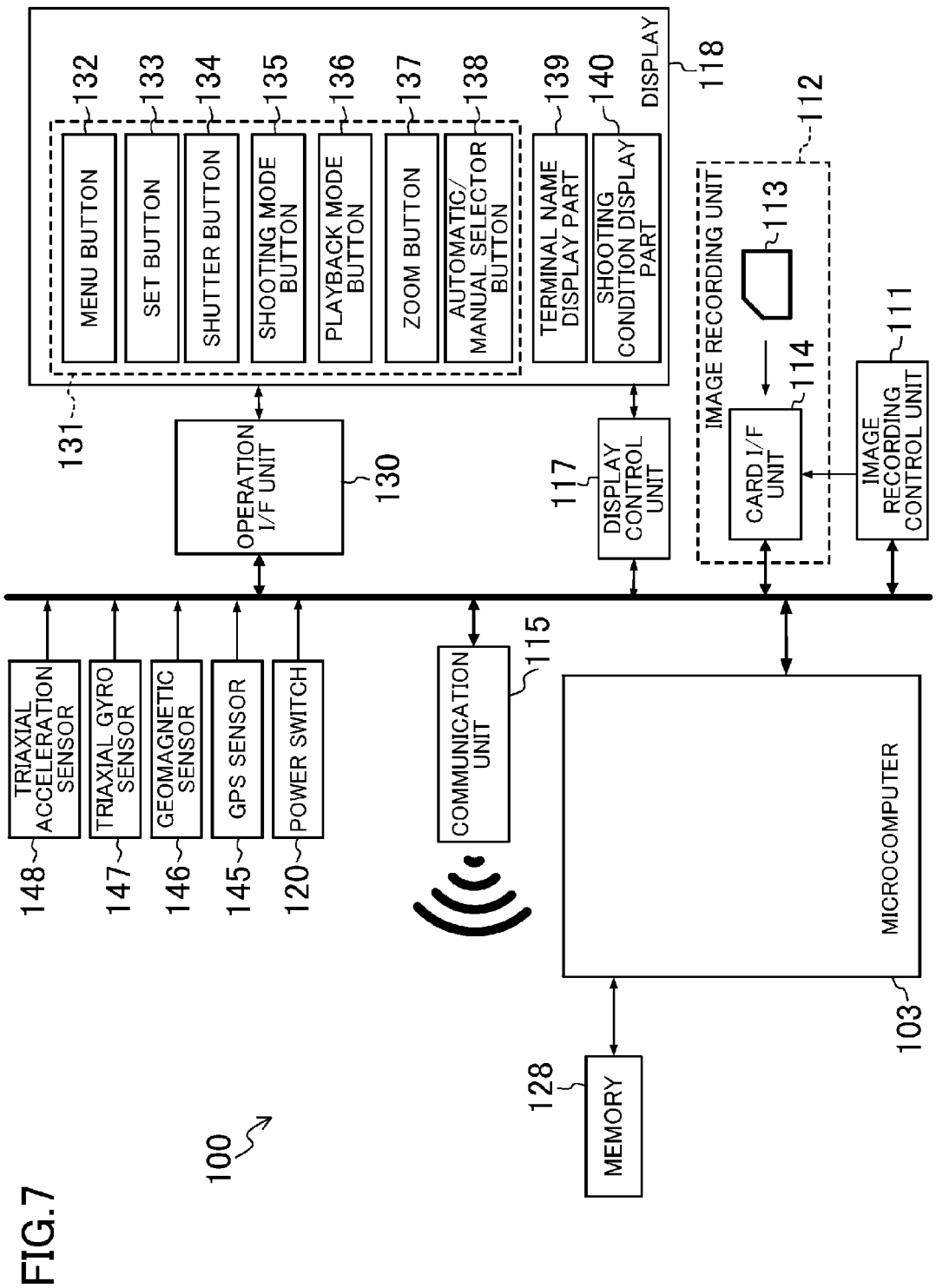
FIG. 7 is a block diagram showing a schematic configuration of the terminal device.
Figure 8:
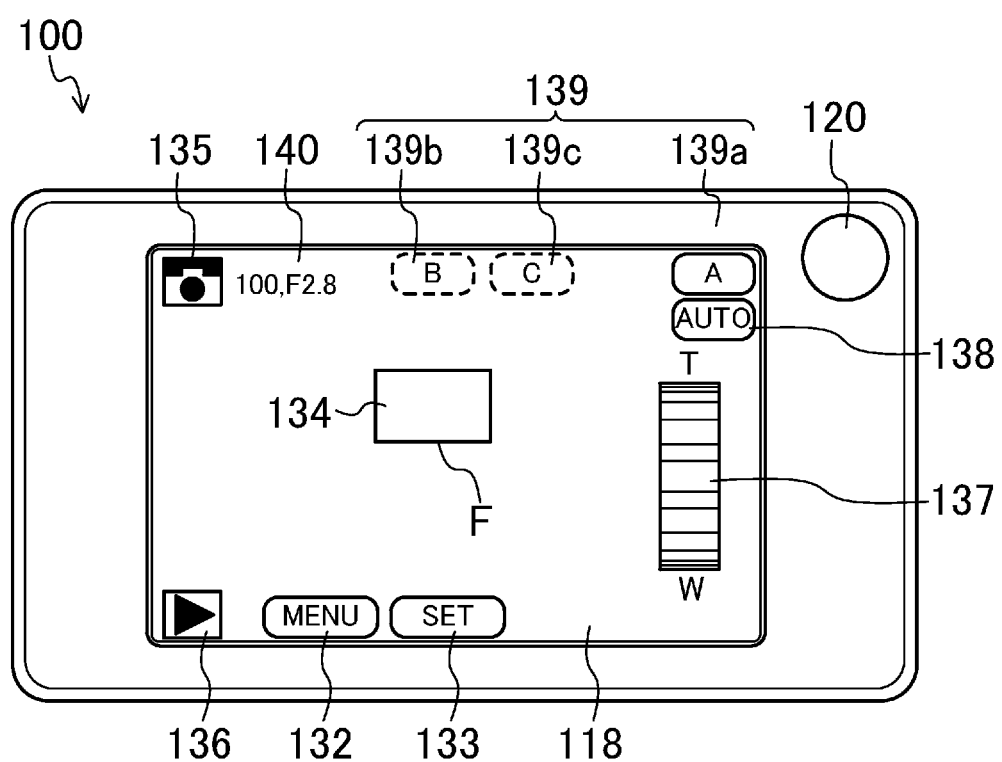
FIG. 8 shows a display of the terminal device.

FIG. 6 is a perspective view of the terminal device 100. FIG. 7 is a block diagram showing a schematic configuration of the terminal device 100. FIG. 8 shows a display 118 of the terminal device 100.

The terminal device 100 may be a smartphone. The terminal device 100 includes a casing 101, a display 118, and a touch panel 119 as shown in FIGS. 6-8. The terminal device 100 is in the shape of a plate which is rectangular when viewed in plan. The terminal device 100 sends a control signal for operating the imaging apparatus 1, and receives a through image or a shot image from the imaging apparatus 1 to display the through image or the shot image on the display 118. For easy description, three-dimensional rectangular coordinates are defined in which a direction of a long side of the terminal device 100 is referred to an X axis, a direction of a short side of the terminal device 100 is referred to a Y axis, and a direction of a thickness of the terminal device 100 is referred to as a Z axis.

The casing 101 includes a front casing 101a and a back casing 101b. The front casing 101a and the back casing 101b are integrally coupled with screws etc. A display window 104 is formed in the front casing 101a. The display 118 is arranged in the display window 104. The display 118 may be a liquid crystal display. The touch panel 119 is arranged to cover the display 118. The touch panel 119 may be an electrostatic touch panel, a resistive film touch panel, an optical touch panel, an ultrasonic touch panel, or an electromagnetic touch panel. The user touches an object displayed on the display 118 with a finger or a pen to operate the terminal device 100 through the touch panel 119. The front casing 101a includes a power switch 120. The power switch 120 is a switch operated to turn on/off the terminal device 100.

The terminal device 100 further includes, as shown in FIG. 7, a microcomputer 103, an image recording control unit 111, an image recording unit 112, a communication unit 115, a display control unit 117, a memory 128, an operation I/F unit 130, a GPS sensor 145, a geomagnetic sensor 146, a triaxial gyro sensor 147, and a triaxial acceleration sensor 148.

The image recording unit 112 includes a card I/F unit 114 to which a removable memory 113 is attachable. The image recording unit 112 stores an image signal (a moving image and a still image) in association with a signal of a reduced image corresponding to the image signal and predetermined information based on a command from the image recording control unit 111. The predetermined information associated with the image signal may include, for example, date information when the image is shot, focal length information, shutter speed information, f/number information, shooting mode information, etc. The predetermined information may be a format similar to Exif®, for example.

The communication unit 115 conducts wireless communication with the imaging apparatus 1 through, for example, wireless LAN. For example, the communication unit 115 is Wi-Fi®-certified, and is Wi-Fi®-connected to the imaging apparatus 1. The terminal device 100 transmits and receives signals to and from the imaging apparatus 1 through the communication unit 115.

The display control unit 117 controls the display 118 based on a control signal from the microcomputer 103. The display 118 displays an image signal read from the image recording unit 112 or an image signal sent from the imaging apparatus 1 through the wireless LAN as a visible image based on a command from the display control unit 117.

The memory 128 stores identification information unique to the terminal device 100. The identification information may be a Wi-Fi® address of the terminal device 100.

The GPS sensor 145 determines a position of the terminal device 100. The GPS sensor 145 determines a latitude/longitude, or a location where a representative landmark exists. The geomagnetic sensor 146 determines a direction which the terminal device 100 faces (e.g., a direction which a normal line to the display 118 points). The triaxial gyro sensor 147 detects an attitude of the terminal device 100, and detects rotation of the terminal device 100 in a pitching direction (X axis), a yawing direction (Y axis), and a rolling direction (Z axis). The triaxial acceleration sensor 148 detects acceleration of the terminal device 100 in the X, Y, and Z axis directions.

The display 118 displays an operation unit 131 which can be operated through the touch panel 119. Output from the touch panel 119 is input to the microcomputer 103 etc. through the operation I/F unit 130.

Specifically, the operation unit 131 includes a MENU button 132, a SET button 133, a shutter button 134, a shooting mode button 135, a playback mode button 136, a zoom button 137, and an automatic/manual selector button 138.

The MENU button 132 is operated to display various menus on the display 118. The SET button 133 is operated to confirm the execution of the menu. The shooting mode button 135 is operated to select a shooting mode. The playback mode button 136 is operated to select a playback mode. The shooting mode button 135 and the playback mode button 136 are alternatively operable. The automatic/manual selector button 138 is operated to select an automatic shooting mode or a manual shooting mode. The automatic shooting mode and the manual shooting mode will be described later.

The shutter button 134 is operated to output a command to the imaging apparatus 1 to perform focusing and driving of the shutter. The shutter button 134 is displayed as the distance measurement frame F. Specifically, in the shooting mode, a rectangular distance measurement frame F is displayed on a subject on the display 118. The distance measurement frame F also functions as the shutter button 134. When the user lightly touches the distance measurement frame F, a control signal instructing the focusing is sent from the terminal device 100 to the imaging apparatus 1. When the user presses the distance measurement frame F for a long time, a control signal instructing the driving of the shutter is sent from the terminal device 100 to the imaging apparatus 1.

The zoom button 137 is operated to output a command to perform zooming to the imaging apparatus 1. The zoom button 137 is a vertically extending bar-shaped button. When the user touches a lower part of the zoom button 137 (a part closer to a letter W), a control signal instructing the zoom lens group L1 to move toward a wide angle position is sent from the terminal device 100 to the imaging apparatus 1. When the user touches an upper part of the zoom button 137 (a part closer to a letter T), a control signal instructing the zoom lens group L1 to move toward a telephoto position is sent from the terminal device 100 to the imaging apparatus 1.

The display 118 displays various types of information. For example, the display 118 displays a terminal name display part 139 and a shooting condition display part 140.

The terminal name display part 139 is an icon indicating which terminal device 100 is used at present. The terminal name display part 139 includes terminal name display icons 139a, 139b, and 139c. The terminal names are A, B, and C in this example. The terminal device 100 displays the terminal name display icon of its own on an upper right part of the display 118, and displays the terminal name display icons of the other terminal devices 100 on the left of the former terminal name display icon. The other terminal name display icons are displayed with a solid line when they are in use, or with a broken line when they are not in use. Thus, the user can see whether the other terminal devices are in use or not.

The shooting condition display part 140 displays shooting conditions set by the imaging apparatus 1, i.e., a shutter speed and an f/number.

Although not shown, the display 118 can display the determination results of the GPS sensor 145 and the geomagnetic sensor 146. In addition, the display 118 can display the determination results of the GPS sensors 145 and the geomagnetic sensors 146 of the other terminal devices 100, and the determination results of the GPS sensor 18 and the geomagnetic sensor 19 of the imaging apparatus 1.

In the following description, the components of the terminal devices 100A, 100B, and 100C will be indicated by their original reference characters added with "A", "B", or "C," if necessary. For example, a "display 118A" is a display of the terminal device 100A, and an "automatic/manual selector button 138B" is an automatic/manual selector button of the terminal device 100B.

(4. Remote Operation)

In the imaging system S configured as described above, the imaging apparatus 1 can be remote-controlled by the terminal device 100.

For example, the through image and the shot image of the imaging apparatus 1 can be checked using the terminal device 100. Specifically, the imaging apparatus 1 sends the through image and the shot image to the terminal device 100, and the terminal device 100 displays the through image and the shot image on the display 118. The distance measurement frame F is shown on the through image.

The terminal device 100 can allow the imaging apparatus 1 to perform the focusing, the zooming, and the shooting. Specifically, the terminal device 100 can adjust the focus and the magnification of the imaging apparatus 1, or can allow the imaging apparatus 1 to perform the shooting by sending a control signal from the terminal device 100 to the imaging apparatus 1.

The terminal device 100 can also operate the electric pan head 51 of the tripod 50. For example, when the user rotates the terminal device 100 in the pitching direction or the yawing direction, the microcomputer 103 of the terminal device 100 detects the movement of the terminal device 100 using one or both of the triaxial gyro sensor 147 and the triaxial acceleration sensor 148, and generates a control signal to be sent to the electric pan head 51 based on the movement. The terminal device 100 sends the control signal to the tripod 50. Upon receiving the control signal, the tripod 50 tilts or pans based on the control signal. Thus, when the user imitates the tilting or the panning with the terminal device 100, the tripod 50 can tilt or pan based on the movement of the terminal device 100. Thus, even through the remote control, the imaging apparatus 1 can be turned to the direction intended by the user. For example, even when the subject moves, the user can easily follow the subject by tilting or panning the terminal device 100 while looking at the through image on the display 118 of the terminal device 100. When the tripod 50 and the terminal device 100 are wirelessly connected through the imaging apparatus 1, the control signal from the terminal device 100 is sent to the tripod 50 through the imaging apparatus 1.

(5. Mode Selection of Imaging Apparatus)

Figure 9:
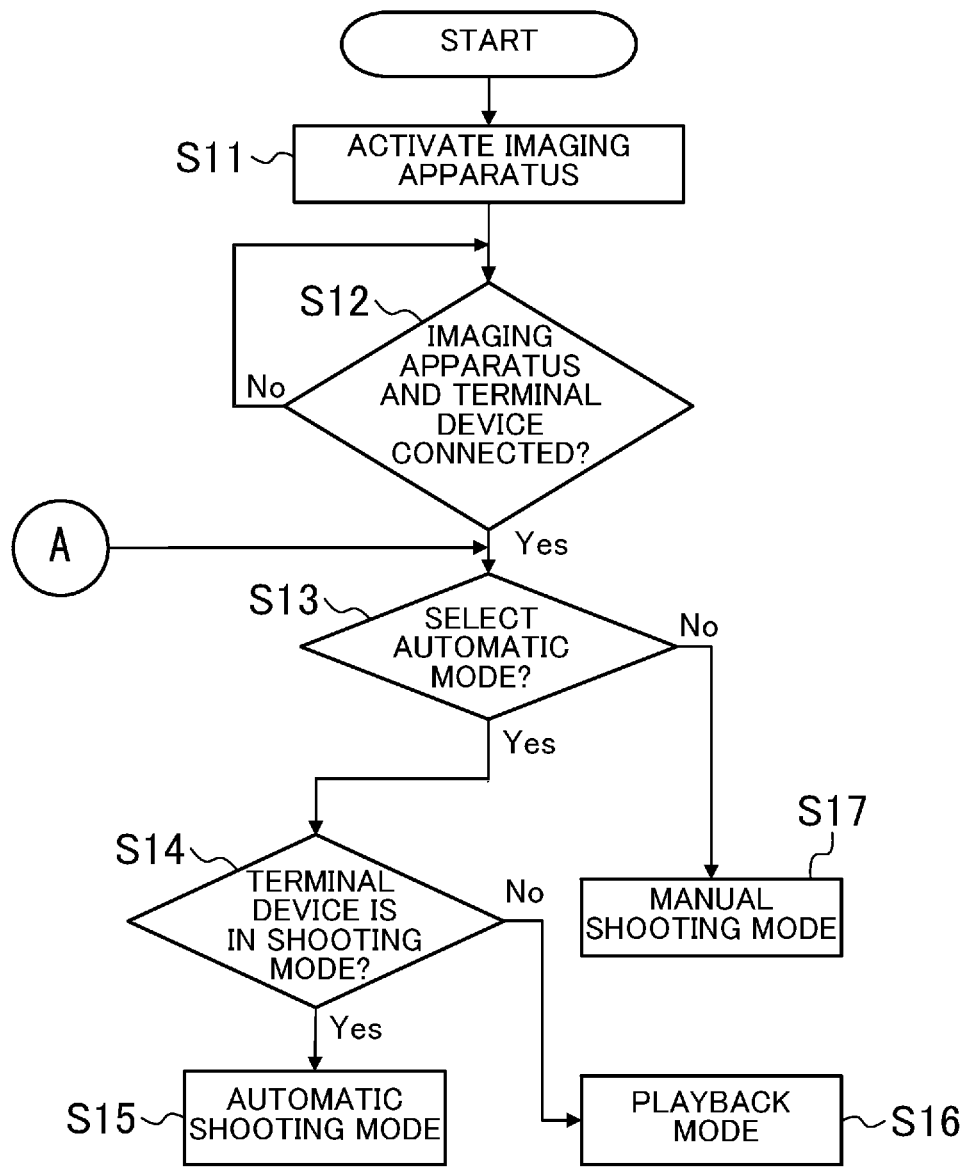
FIG. 9 is a flowchart of mode selection of the imaging apparatus.

FIG. 9 is a flowchart of mode selection of the imaging apparatus 1. Referring to FIG. 9, the mode selection of the imaging apparatus 1 will be described below. In this example, the imaging apparatus 1 can be wirelessly connected to the three terminal devices 100A, 100B, and 100C. In the following description, S designates step.

First, the imaging apparatus 1 is turned on to activate the imaging apparatus 1. Thus, the imaging apparatus 1 is ready for the shooting (S11).

Then, the imaging apparatus 1 determines whether the imaging apparatus 1 is in wireless connection with the terminal device 100 in S12. Specifically, when the terminal device 100 is turned on, and is located in a range where the terminal device 100 can be wirelessly connected to the imaging apparatus 1, the wireless connection between the imaging apparatus 1 and the terminal device 100 is established. The imaging apparatus 1 checks current connection to the terminal devices 100A, 100B, and 100C, and determines which terminal device 100 is in wireless connection. The imaging device 1 can determine that the terminal device 100 is in wireless connection when the imaging apparatus 1 sends a request signal for confirming the connection to the terminal device 100, and a response signal is sent back from the terminal device 100. The following flow will be described on condition that the three terminal devices 100A, 100B, and 100C are in wireless connection.

Then, in S13, the imaging apparatus 1 determines whether each of the wirelessly connected terminal devices 100 is in an automatic mode or a manual mode. When the automatic mode is selected, the flow proceeds to S14. When the manual mode is selected, the flow proceeds to S17. In S14, the imaging apparatus 1 determines whether the terminal device 100 in the automatic mode is in a shooting mode or a playback mode. When the shooting mode is selected, the flow proceeds to S15. When the playback mode is selected, the flow proceeds to S16. In S15, processing in an automatic shooting mode is performed. In S16, processing in a playback mode is performed. In S17, processing in a manual shooting mode is performed. The determinations in S13 and S14 are performed on every terminal device 100.

(6. Automatic Shooting Mode)

Figure 10:
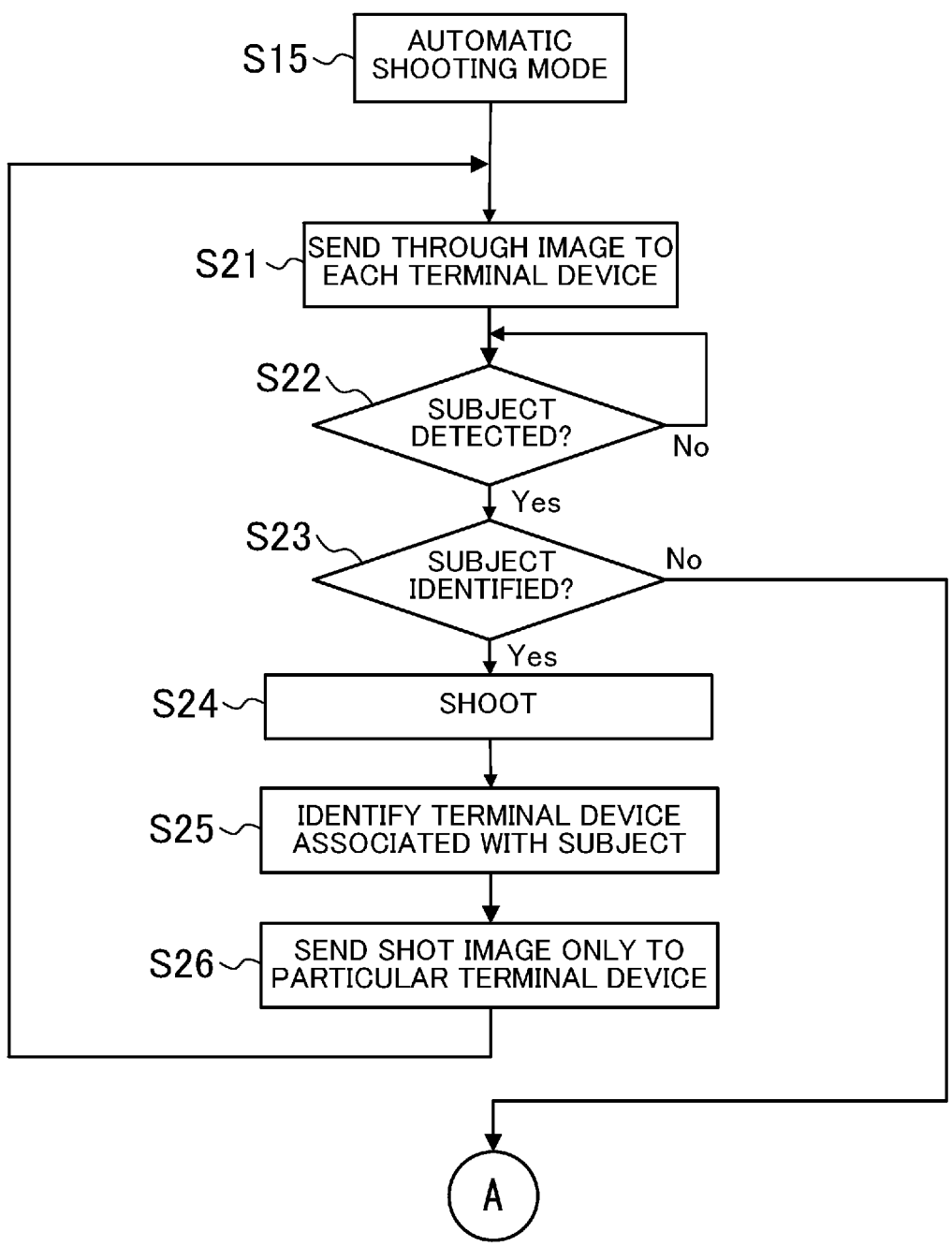
FIG. 10 is a flowchart of processing in an automatic shooting mode.

FIG. 10 is a flowchart of the processing in the automatic shooting mode. In this example, all the terminal devices 100A, 100B, and 100C are in the automatic shooting mode. In the automatic shooting mode, the imaging apparatus 1 sends the through image captured by the image sensor 4 to the terminal devices 100A, 100B, and 100C through the communication unit 15 in S21. Each of the terminal devices 100 receives the through image via the communication unit 115, and displays the through image on the display 118. The terminal devices 100A, 100B, and 100C receive the same through image. Thus, the through image captured by the image sensor 4 is displayed on the terminal devices 100A, 100B, and 100C in real time.

The imaging apparatus 1 performs face detection on the subject in the through image in S22. When a face is detected in the through image, the flow proceeds to S23. When the face is not detected, the flow repeats S22.

In S23, the imaging apparatus 1 identifies the subject based on the detected face. Specifically, the imaging apparatus 1 extracts feature data from the detected face, and checks the extracted data against the face registration database 23. When the extracted feature data coincides with feature data registered in the face registration database 23, the imaging apparatus 1 determines that the subject is a person registered in the face registration database 23. Thus, a particular subject is detected. In this example, faces of persons A, B, and C are registered in the face registration database 23. Thus, when an image of the subjects shown in FIG. 1 is captured, the persons A and B are identified. Then, information that the persons A and B are contained in the image is stored in the memory 28. When the detected face does not coincide with the faces registered in the face registration database 23, the flow returns to S13.

When the face of the particular subject is detected, the imaging apparatus 1 identifies the terminal device 100 corresponding to the particular subject by referring to the identification information table 25 of the identification information storage unit 24. Specifically, the imaging apparatus 1 identifies the terminal device 100A as the terminal device corresponding to the person A, and the terminal device 100B as the terminal device corresponding to the person B.

Figure 11:
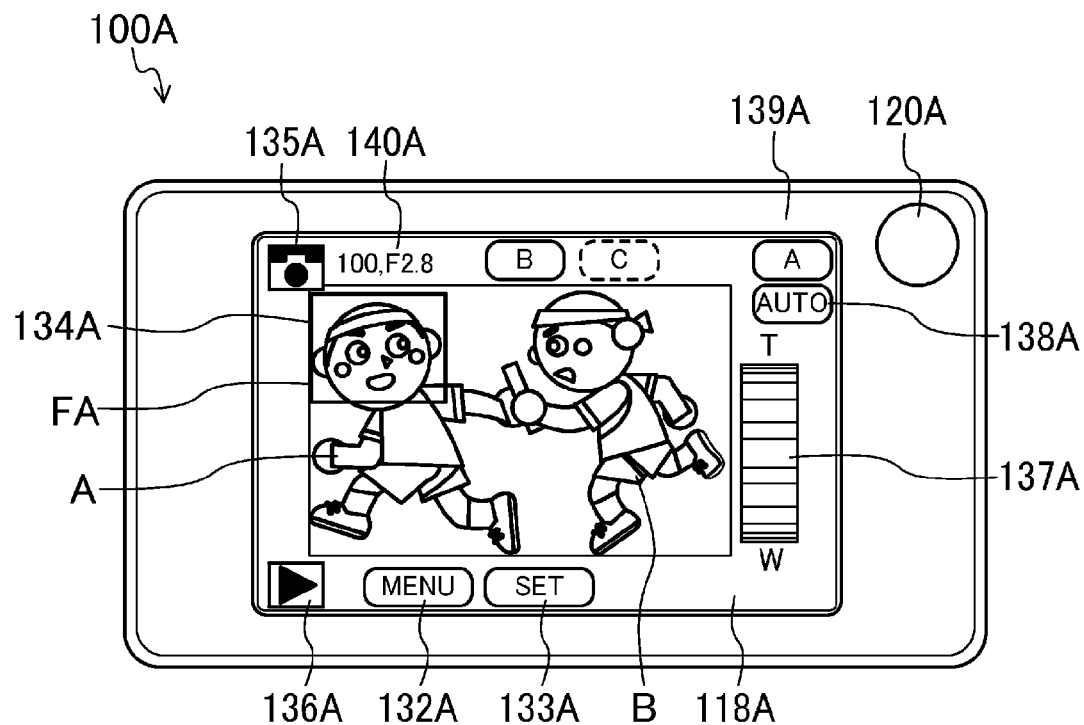
FIG. 11 shows a display of the terminal device displaying a through image.
Figure 12:
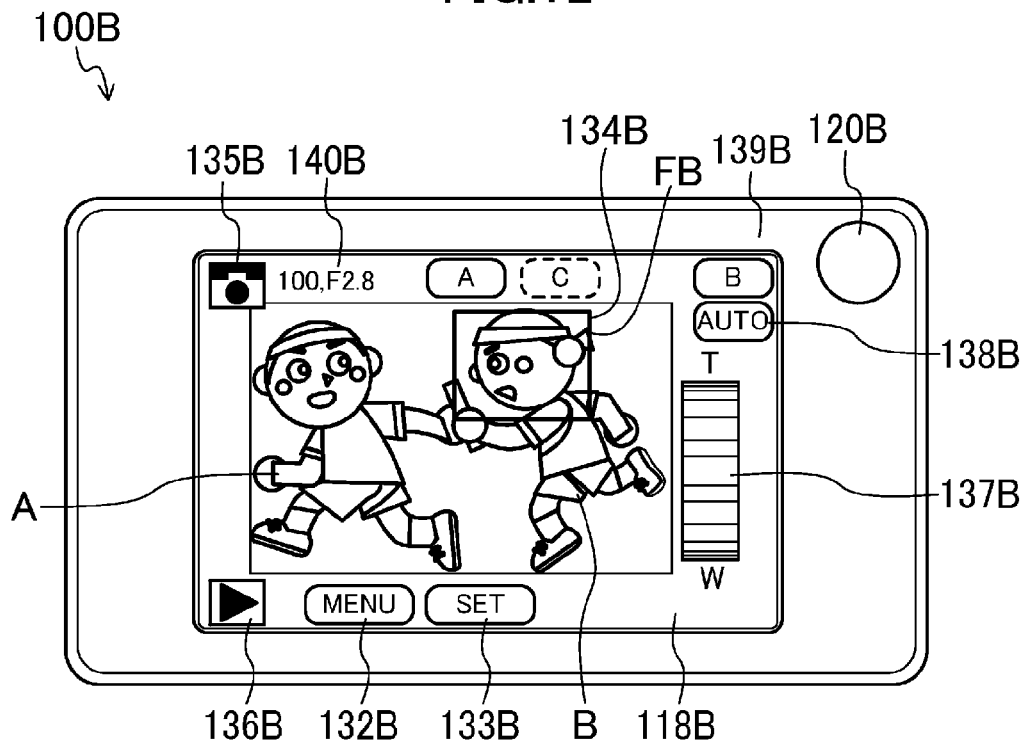
FIG. 12 shows a display of another terminal device displaying a through image.

When the particular subject registered in the database is detected, the imaging apparatus 1 adds a distance measurement frame surrounding the face of the subject to the through image sent to the terminal device 100 corresponding to the particular subject. FIG. 11 shows the display 118 of the terminal device 100A displaying the through image, and FIG. 12 shows the display 118 of the terminal device 100B displaying the through image. Specifically, the imaging apparatus 1 adds a distance measurement frame FA to the face of the subject A in the through image sent to the terminal device 100A, and adds a distance measurement frame FB to the face of the subject B in the through image sent to the terminal device 100B. The distance measurement frame is not added to the faces of subjects A and B in the through image sent to the terminal device 100C.

In S24, the imaging apparatus 1 automatically performs the shooting when the imaging apparatus 1 determines that the subject is the registered particular subject. When two or more registered particular subjects are contained in the image, the imaging apparatus 1 selects the shooting conditions relative to one of the subjects to which higher priority is given in advance. The order of priority can be stored in the identification information table 25, for example. The higher priority is given to the subject registered in the higher column in the identification information table 25. In the example shown in FIG. 5, the subject A is registered in the higher column in the identification information table 25 than the subject B. Thus, the higher priority is given to the subject A. Therefore, when the image shown in FIGS. 11 and 12 is shot, the shooting conditions are set relative to the subject A. The priority can be set by storing the priority in association with the particular subject and the corresponding terminal device 100 in the identification information table 25. The shooting conditions include various conditions associated with the shooting. For example, the imaging apparatus 1 can perform photometry and distance measurement relative to the subject A. In the photometry, the digital signal processing unit 8 calculates an exposure value based on an image signal from the face of the subject A and its vicinity output by the image sensor 4. The microcomputer 3 determines a suitable shutter speed based on the calculated exposure value. The focus control unit 36 performs the focusing by moving the focus lens group L2 so that the image signal in the distance measurement frame FA shows a peak contrast value. The shooting conditions may contain white balance, photographic sensitivity, zoom magnification, etc.

When the imaging apparatus 1 automatically shoots the particular subject, the imaging apparatus 1 identifies the terminal device 100 associated with the particular subject based on the identification information table 25 in S25. In this example, the subjects A and B are shot. Thus, the terminal device 100A associated with the subject A and the terminal device 100B associated with the subject B are identified in the identification information table 25. Then, the imaging apparatus 1 automatically sends the shot image to the terminal devices 100A and 100B in S26, and notifies the terminal devices 100A and 100B that the image is sent. The image sent to the terminal devices 100A and 100B is shot under the shooting conditions selected relative to the subject A. Then, the flow returns to S21.

Upon receiving the shot image and the notice, each of the terminal devices 100A and 100B displays the shot image on the display 118, and records the image in the image recording unit 112. The shot image is not sent to the terminal device 100C.

In sending the shot image and the notice, the imaging apparatus 1 checks whether the terminal devices 100 are still in wireless connection. If the wireless connection has been shut down because the terminal devices 100 are turned off, or the communication environment is deteriorated, the imaging apparatus 1 temporarily records the shot image in the image recording unit 12. When it is detected that the wireless connection with the terminal devices 100 becomes active again, the shot image is read out of the image recording unit 12, and is sent to the terminal devices 100.

As described above, the imaging apparatus 1 includes the image sensor 4 configured to capture an image of the subject, the identification information storage unit 24 configured to store one or multiple particular subjects and one or multiple terminal devices 100 corresponding to the subjects, the face detection unit 21 and the face recognition unit 22 configured to detect the particular subject stored in the identification information storage unit 24 in the image captured by the image sensor 4, and the microcomputer 3 configured to send the image to the terminal device 100. The imaging apparatus 1 is configured to send the image to the terminal device 100. When the face detection unit 21 and the face recognition unit 22 detect the particular subject, the microcomputer 3 sends the image to the terminal device 100 which is stored in the identification information storage unit 24 and corresponds to the particular subject. The imaging system S includes the terminal device 100, and the imaging apparatus 1 which is configured to be remote-controlled by the terminal device 100, and to send the image to the terminal device 100. The imaging apparatus 1 includes the image sensor 4 configured to capture an image of the subject, the identification information storage unit 24 configured to store one or multiple particular subjects and one or multiple terminal devices 100 corresponding to the subjects, the face detection unit 21 and the face recognition unit 22 configured to detect the particular subject stored in the identification information storage unit 24 in the image captured by the image sensor 4, and the microcomputer 3 configured to send the image to the terminal device 100. When the face detection unit 21 and the face recognition unit 22 detect the particular subject, the microcomputer 3 sends the image to the terminal device 100 which is stored in the identification information storage unit 24 and corresponds to the particular subject. Specifically, the imaging system S includes the single imaging apparatus 1 to which the multiple terminal devices 100 are wirelessly connected. When the subject is identified by the imaging apparatus 1 in the automatic shooting mode, the captured image can automatically be sent to the terminal device 100 associated with the identified subject. Thus, the user no longer needs to classify the shot images according to the subject. This can improve usability of the imaging system.

When the face detection unit 21 and the face recognition unit 22 detect the multiple particular subjects, the microcomputer 3 performs the shooting under a shooting condition set relative to one of the detected particular subjects, and sends a shot image to the multiple terminal devices 100 which are stored in the identification information storage unit 24 and correspond to the detected multiple particular subjects. Specifically, when the multiple particular subjects are present in the image, the shooting is performed under the shooting conditions set relative to one of the particular subjects. The same shot image is sent to the multiple terminal devices corresponding to the multiple particular subjects present in the image. Thus, even when the multiple particular subjects are present in the image, the image is shot only once, thereby simplifying the shooting. For example, relative to which one of the multiple particular subjects present in the image the shooting conditions are set may be determined based on the predetermined priority of the particular subjects. Alternatively, the shooting conditions may be selected relative to the particular subject selected through the terminal device 100. In this case, the shooting conditions are automatically set by the imaging apparatus 1 based on the through image etc.

In the above-described example, the shot image is sent to the terminal device 100. However, only the notice may be sent to the terminal device 100, and the shot image may be sent to a server specified in advance. In this case, an URL of the stored image may be sent from the server to the terminal device 100 via an e-mail etc.

The imaging apparatus 1 is configured to send the through image to all the terminal devices 100. However, the sending of the through image is not limited to this example. When the imaging apparatus 1 detects the particular subject in the through image, the through image may be sent only to the terminal device 100 corresponding to the detected particular subject.

When the particular subject corresponding to the terminal device 100C is not present in the shot image, the shooting conditions used for the shooting may be sent to the terminal device 100C. Specifically, the microcomputer 3 performs the shooting when the particular subject is detected in the image captured by the image sensor 4, and may send the used shooting conditions to the terminal device 100 which is stored in the identification information storage unit 24 and does not correspond to the detected particular subject. Thus, the terminal device 100C can obtain the shooting conditions for the current situation. Since brightness of background may probably not change immediately, the terminal device 100C can set the shooting conditions suitable for the current situation in advance. This is advantageous when the terminal device 100C performs the manual shooting.

When one or more terminal devices 100 wirelessly connected to the imaging apparatus 1 are not in the automatic shooting mode, the above-described processing is performed only for the terminal device 100 in the automatic shooting mode. The subject A and the user a may be the same person, e.g., in shooting the user himself in memory of a special occasion.

(7. Manual Shooting Mode)

Figure 13:
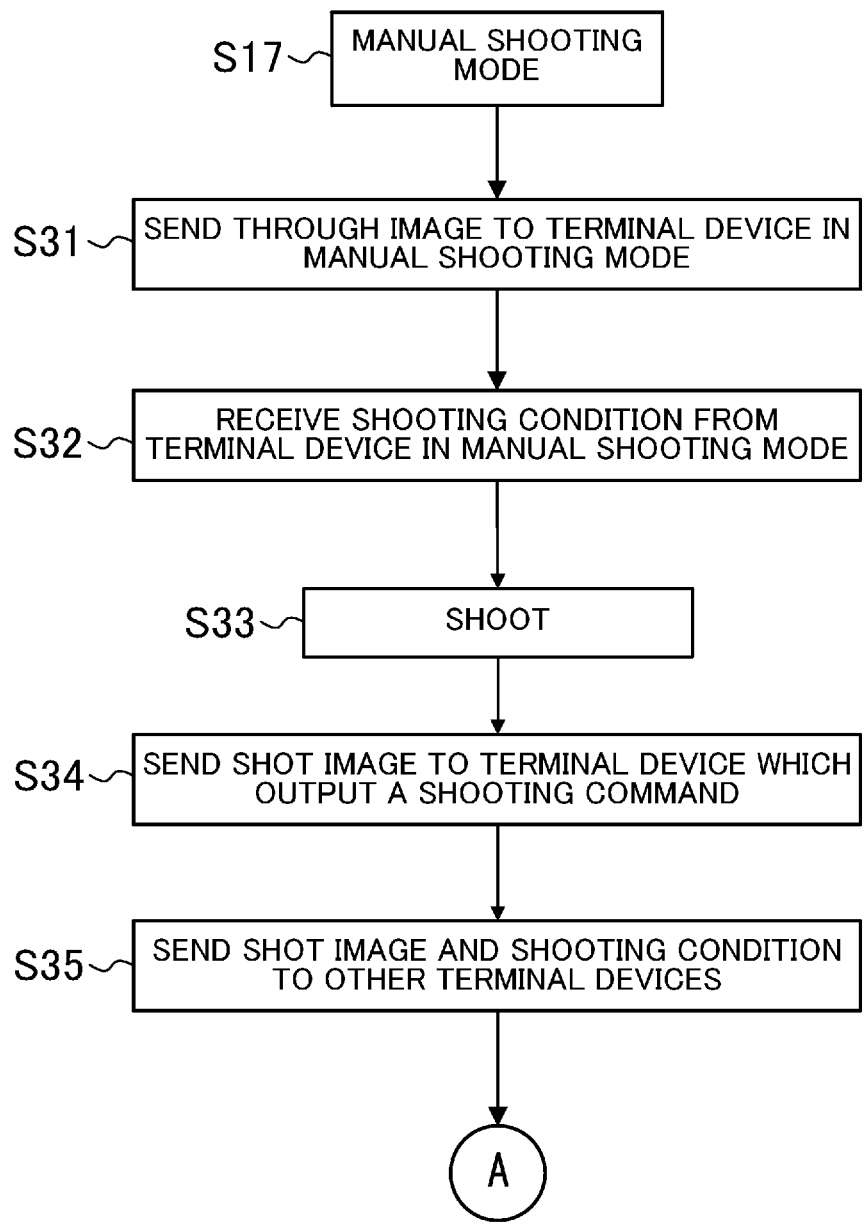
FIG. 13 is a flowchart of processing in a manual shooting mode.
Figure 14:
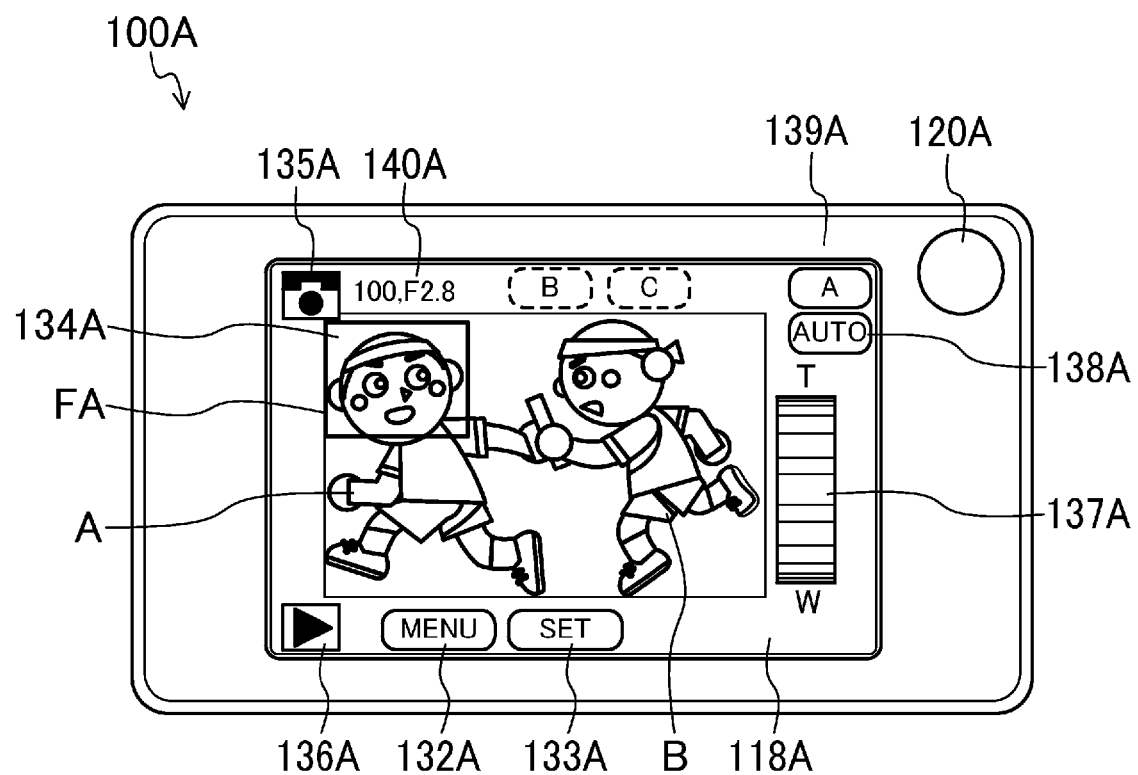
FIG. 14 shows a display of the terminal device in the manual shooting mode.

A manual shooting mode will be described below. FIG. 13 is a flowchart of processing in the manual shooting mode. FIG. 14 shows the display 118 of the terminal device 100A in the manual shooting mode. In this example, only the terminal device 100A is in the manual shooting mode. In the manual shooting mode, an automatic/manual selector button 138A of the terminal device 100A displays "manual."

In the manual shooting mode, the imaging apparatus 1 sends the through image captured by the image sensor 4 to the terminal device 100A in the manual shooting mode via the communication unit 15 in S31.

In S32, the imaging apparatus 1 sets various shooting conditions upon receiving the shooting conditions from the terminal device 100A. Specifically, the user touches a MENU button 132A of the terminal device 100A to manually select the shooting conditions of the imaging apparatus 1. For example, the shutter speed is set to ¹⁄₁₀₀, and the f/number is set to F2.8. When the shooting conditions are set, the selected shooting conditions are displayed on a shooting condition display part 140A on an upper left part of the display 118A. When the setting of the shooting conditions on the terminal device 100A is finished, the set shooting conditions are sent from the terminal device 100A to the imaging apparatus 1. At this time, the terminal device 100A also sends identification information thereof. Upon receiving the shooting conditions from the terminal device 100A, the imaging apparatus 1 determines whether the shooting conditions are sent from the terminal device 100 in the manual shooting mode based on the identification information. When it is determined that the shooting conditions are those from the terminal device 100 in the manual shooting mode, the imaging apparatus 1 sets the sent shooting conditions as the shooting conditions of the imaging apparatus 1.

In S33, the shooting is performed. The shooting is executed when the user operates the terminal device 100A. Specifically, when the user lightly touches the shutter button 134A displayed on the display 118A, a signal indicating this event is sent from the terminal device 100A to the imaging apparatus 1. When the imaging apparatus 1 receives the signal, the microcomputer 3 performs the focusing by controlling the focus control unit 36 to move the focus lens group L2 so that a peak contrast value of the image signal is obtained. Then, when the user presses the shutter button 134A displayed on the display 118A for a long time, a signal indicating this event is sent from the terminal device 100A to the imaging apparatus 1. When the imaging apparatus 1 receives the signal, the microcomputer 3 controls the CCD drive control unit 5 and the shutter control unit 31 to perform the shooting. Thus, the manual shooting is performed under the exposure and distance conditions set through the terminal device 100A.

Then, in S34, the imaging apparatus 1 automatically sends the shot image to the terminal device 100A which output the shooting command, and notifies the terminal device 100A of this event. Upon receiving the shot image and the notice, the terminal device 100A displays the shot image on the display 118A.

In S35, the imaging apparatus 1 automatically sends the shot image and the used shooting conditions to the terminal devices except for the terminal device 100A which output the shooting command, i.e., to the terminal devices 100B and 100C. Upon receiving the shot image and the shooting conditions, the terminal devices 100B and 100C display the shot image and the shooting conditions on the displays 118B and 118C, and store the image in the image recording unit 112B and 112C. At this time, the terminal devices 100B and 100C may automatically set the received shooting conditions as their shooting conditions.

As described above, the imaging apparatus 1 includes the image sensor 4 configured to capture an image of the subject, the identification information storage unit 24 configured to store the particular terminal devices 100, and the microcomputer 3 configured to perform the shooting using the image sensor 4. The imaging apparatus 1 is configured to be remote-controlled by the terminal device 100, and to send the image to the terminal device 100. When the shooting is performed in response to the remote control by the particular terminal device 100, the microcomputer 3 sends a shooting condition used for the shooting to the terminal device 100 which is stored in the storage unit 24 and does not correspond to the shot particular subject. The imaging system S includes the terminal device 100, and the imaging apparatus 1 which is configured to be remote-controlled by the terminal device 100, and to send the image to the terminal device 100. The imaging apparatus 1 includes the image sensor 4 configured to capture an image of the subject, the identification information storage unit 24 configured to store the particular terminal devices 100, and the microcomputer 3 configured to perform the shooting using the image sensor 4. When the shooting is performed in response to the remote control by the particular terminal device 100, the microcomputer 3 sends the shooting condition used for the shooting to the terminal device 100 which is stored in the storage unit 24 and does not correspond to the shot particular subject. Specifically, in the imaging system S including the single imaging apparatus 1 to which multiple terminal devices 100 are wirelessly connected, the shooting conditions set for the shooting by a certain user can automatically be sent to the terminal devices 100 of the other users in the manual shooting mode. Thus, when the other user performs the shooting successively, the user can employ the received shooting conditions. Therefore, time for setting the shooting conditions can be saved, and the suitable shooting conditions can be set. This can improve usability in setting the shooting conditions.

When the shooting is performed in response to the remote control by the terminal device 100, the microcomputer 3 can set the shooting conditions based on the remote control by the terminal device 100. Specifically, the shooting conditions can be set by the remote control.

In addition to the shooting conditions, the microcomputer 3 also sends the shot image to the terminal devices 100 except for the terminal device 100 which performed the remote control. Thus, the shooting conditions can suitably be set by referring to the shot image and the used shooting conditions. Specifically, when the shooting is performed in the similar environment, time for setting the shooting conditions can be saved. When the shot image does not match the user's taste, the shooting conditions different from the used shooting conditions may be set to perform the shooting based on the user's taste. This can reduce a probability of taking failed pictures.

When the imaging apparatus 1 is configured to be operated only in the manual shooting mode, the identification information storage unit 24 does not need to store the identification information table 25, and may store particular terminal devices 100. The face detection unit 21 and the face recognition unit 22 can be omitted.

In the above example, the shot image and the used shooting conditions are sent to the other terminal devices 100B and 100C. However, only the shooting conditions may be sent to the other terminal devices 100B and 100C, and the terminal devices 100B and 100C may automatically set the received shooting conditions. Specifically, the other users b and c do not set their own shooting conditions, i.e., the shooting conditions for the terminal devices 100B and 100C of the other users b and c are automatically set based on the taste of the user a. In this way, the other users can save time for setting the shooting conditions when a particular user has set the shooting conditions.

When the terminal devices 100B and 100C are in the manual shooting mode, the same processing described above is performed.

(8. Playback Mode)

Figure 15:
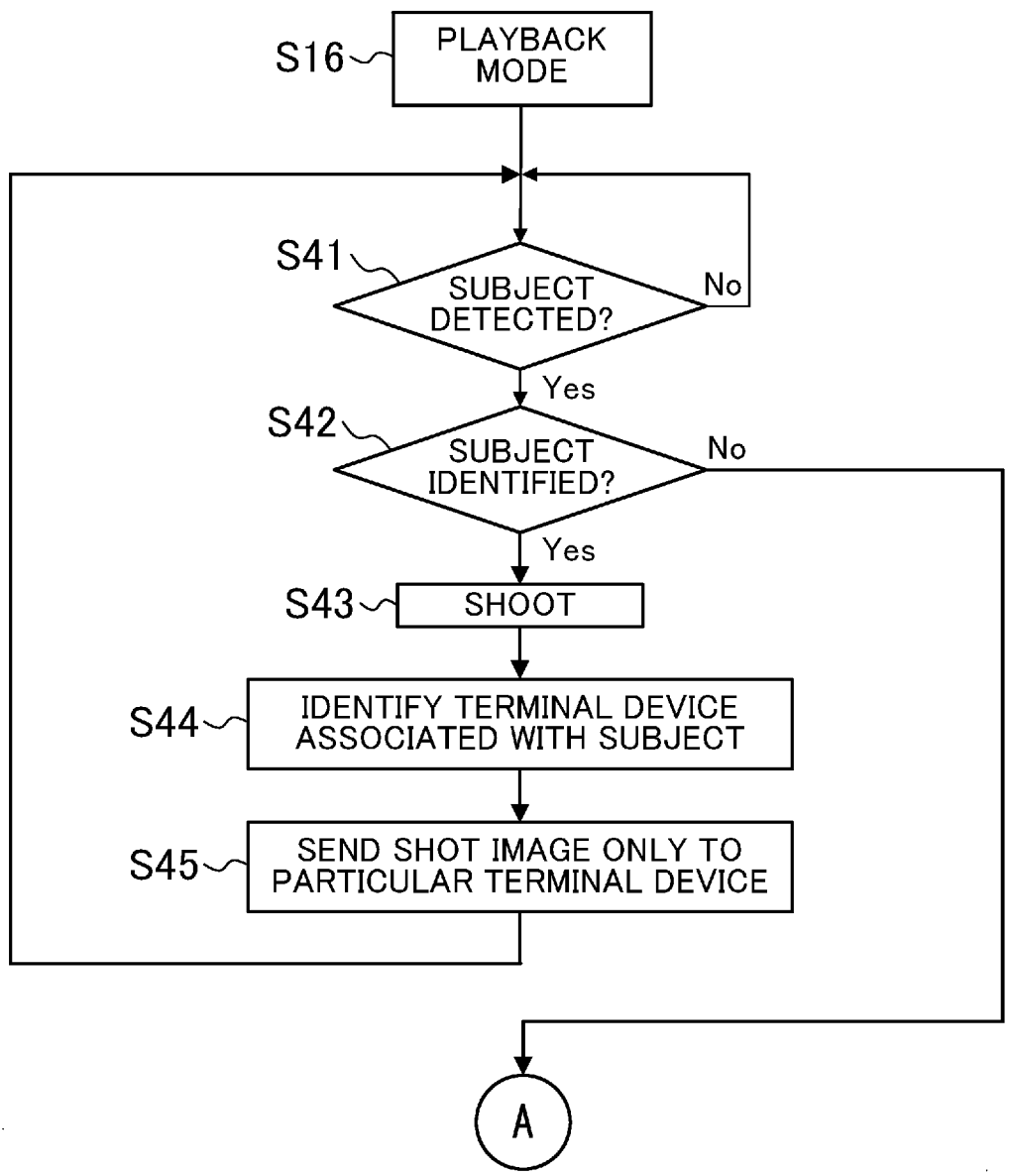
FIG. 15 is a flowchart of processing in a playback mode.
Figure 16:
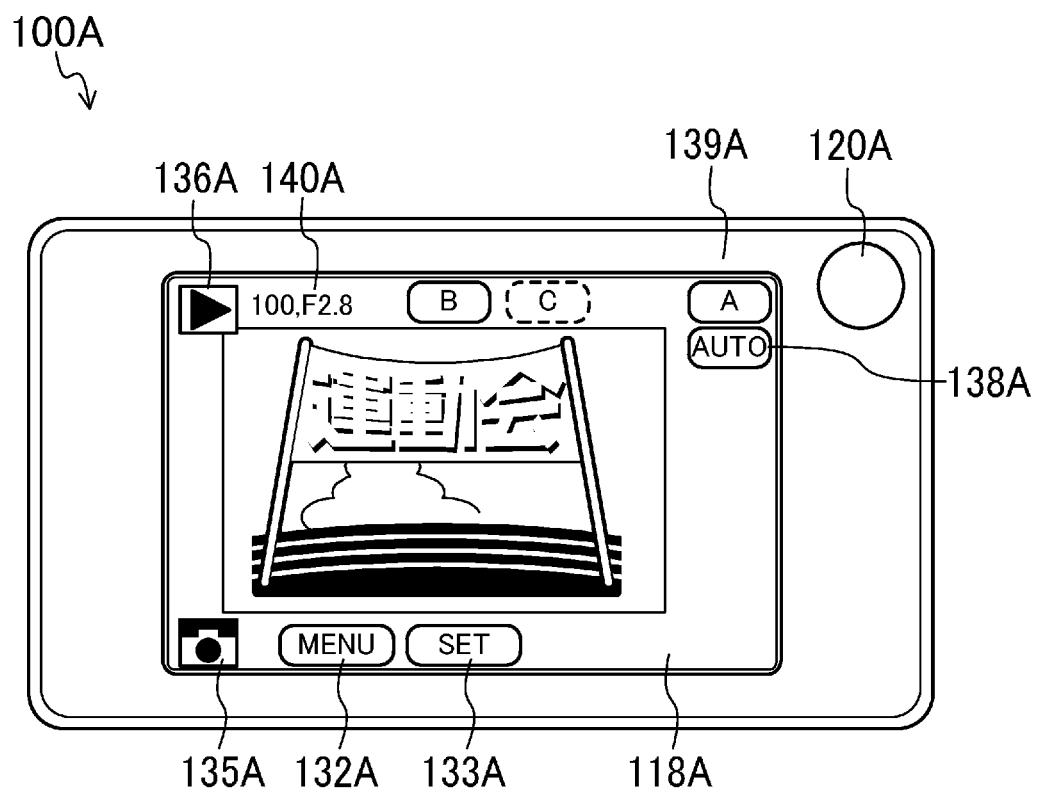
FIG. 16 shows a display of the terminal device in the playback mode.

A playback mode will be described below. FIG. 15 is a flowchart of processing in the playback mode, and FIG. 16 shows the display 118 of the terminal device 100A in the playback mode. In this example, the terminal devices 100A, 100B, and 100C are in the playback mode. In the playback mode, a playback mode button 136A is displayed on an upper left part of the display 118.

In the playback mode, the terminal device 100A displays the shot image read from the image recording unit 112A on the display 118A. The imaging apparatus 1 keeps capturing the through image.

In S41, the imaging apparatus 1 performs face detection on the subject in the through image. When a face is detected in the through image, the flow proceeds to S42. When the face is not detected, the flow repeats S41. In S42, the imaging apparatus 1 identifies the subject based on the detected face. When it is determined that the subject is a registered particular person, the imaging apparatus 1 automatically performs the shooting in S43. When the particular subject is automatically shot, the imaging apparatus 1 identifies the terminal device 100 associated with the subject based on the identification information table 25 in S44. In this example, the subjects A and B are shot, and the terminal device 100A associated with the subject A and the terminal device 100B associated with the subject B in the identification information table 25 are identified. Then, the imaging apparatus 1 automatically sends the shot image to the terminal devices 100A and 100B in S45, and notifies the terminal devices 100A and 100B of the event. The processing of S41-S45 is the same as the processing in S22-S26 in the automatic shooting mode.

Upon receiving the shot image and the notice, the terminal devices 100A and 100B change the playback mode to the automatic shooting mode. Specifically, each of the terminal devices 100A and 100B cancels the playback of the shot image etc., and displays the shot image sent from the imaging apparatus 1 on the display 118, and then records the sent image in the image recording unit 112.

The shot image and the notice are not sent to the terminal device 100C. Thus, the terminal device 100C remains in the playback mode.

As described above, the imaging apparatus 1 is configured to be remote-controlled by the terminal device 100, and to send the image to the terminal device 100. The imaging apparatus 1 includes the image sensor 4 configured to capture an image of the subject, the identification information storage unit 24 configured to store one or multiple particular subjects and one or multiple terminal devices 100 corresponding to the subjects, the face detection unit 21 and the face recognition unit 22 configured to detect the particular subject stored in the identification information storage unit 24 in the image captured by the image sensor 4, and the microcomputer 3 configured to notify the terminal device 100 which is stored in the identification information storage unit 24 and corresponds to the particular subject that the particular subject is detected by the face detection unit 21 and the face recognition unit 22. The imaging system S includes the terminal device 100, and the imaging apparatus 1 which is configured to be remote-controlled by the terminal device 100, and to send the image to the terminal device 100. The imaging apparatus 1 includes the image sensor 4 configured to capture an image of the subject, the identification information storage unit 24 configured to store one or multiple particular subjects and one or multiple terminal devices 100 corresponding to the subjects, the face detection unit 21 and the face recognition unit 22 configured to detect the particular subject stored in the identification information storage unit 24 in the image captured by the image sensor 4, and the microcomputer 3 configured to notify the terminal device 100 which is stored in the identification information storage unit 24 and corresponds to the particular subject that the particular subject is detected by the face detection unit 21 and the face recognition unit 22. Specifically, the imaging system S includes the single imaging apparatus 1 to which multiple terminal devices 100 are wirelessly connected. When the particular subject is detected by the imaging apparatus 1 in the playback mode, the imaging apparatus 1 notifies the terminal device 100 previously associated with the particular subject of the event even when the through image is not displayed on the terminal device 100. The notified user can allow the terminal device 100 to display the through image to perform the shooting. This can prevent missing of the right moment to take a picture. Thus, the convenience in use of the single imaging apparatus by the plurality of users can be improved.

In notifying the terminal device 100 corresponding to the particular subject that the particular subject is detected, the microcomputer 3 sends the image to the terminal device 100. Upon receiving the notice and the image from the imaging apparatus 1, the terminal device 100 including the display 118 configured to display the image displays the image on the display 118. Thus, when the particular subject is detected, the terminal device 100 corresponding to the particular subject is automatically changed from the playback mode to the shooting mode. This can quickly bring the terminal device 100 into a state ready for shooting the subject.

In the above example, the playback mode is changed to the automatic shooting mode. However, the playback mode may be changed to the manual shooting mode. In this case, S44 is performed without performing the shooting in S43, and then the through image is sent only to the particular terminal devices 100A and 100B. Then, the processing of S31-S35 in the manual shooting mode is performed.

When the particular subject is detected, the terminal device 100 corresponding to the detected particular subject is changed from the playback mode to the shooting mode. However, the terminal device 100 may remain in the playback mode. Specifically, when the terminal device 100 is notified that the particular subject is detected, the terminal device 100 may notify the user of the event. For example, the event may be displayed on the display 118, or the event may be notified by making a sound. Then, the user may select the playback mode or the shooting mode, or the user may select the automatic shooting mode or the manual shooting mode in selecting the shooting mode.

In the playback mode, a subscreen for displaying the through image captured by the imaging apparatus 1 may simultaneously be displayed on part of the display 118 of the terminal device 100.

When one or more terminal devices 100 wirelessly connected to the imaging apparatus 1 are not in the playback mode, the above-described processing is performed only for the terminal device 100 in the playback mode.

(9. Automatic Shooting Mode according to Alternative)

Figure 17:
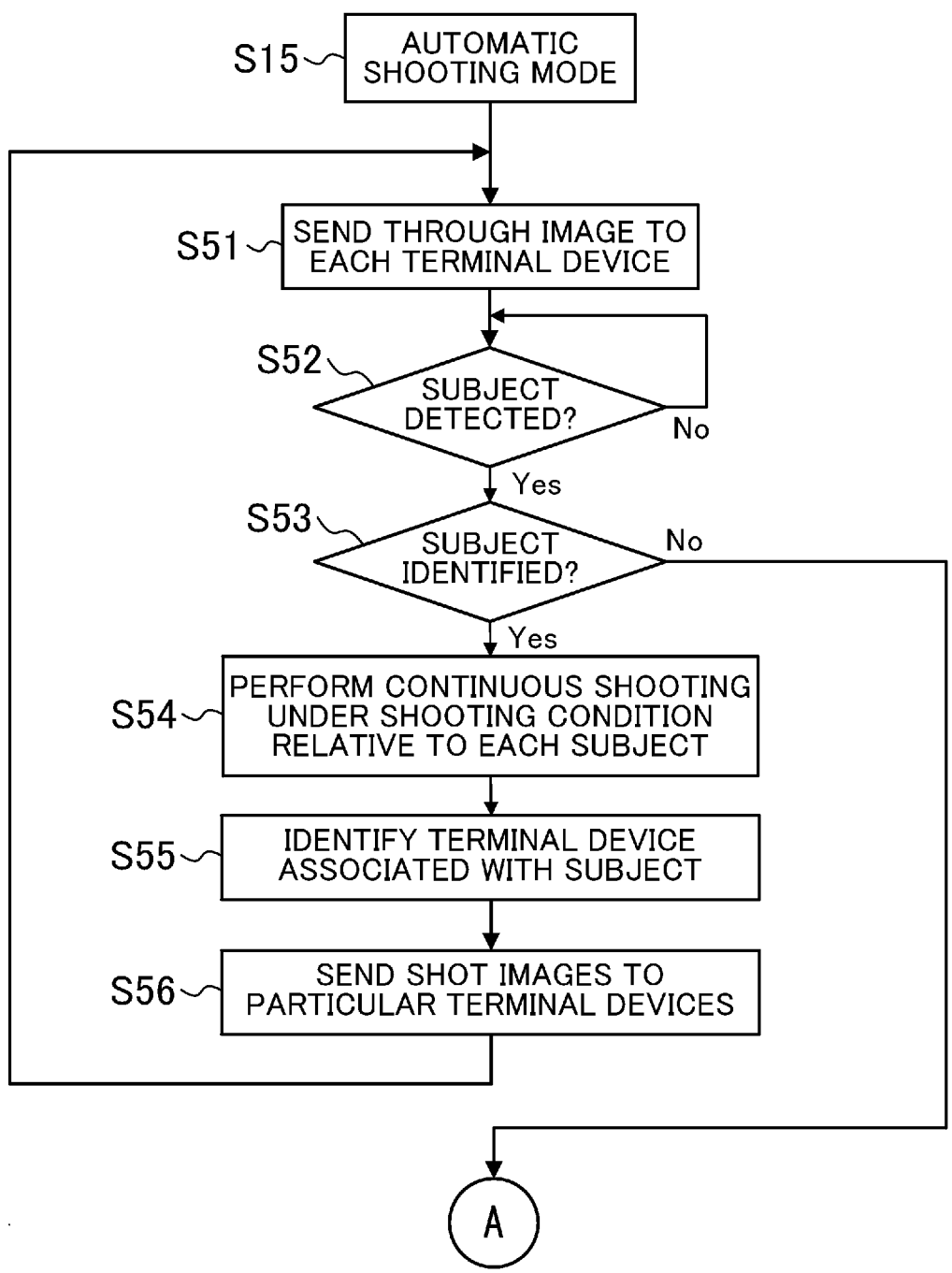
FIG. 17 is a flowchart of processing in an automatic shooting mode according to an alternative.

An automatic shooting mode according to an alternative will be described below. FIG. 17 is a flowchart of processing in the automatic shooting mode. This mode may be referred to as an automatic continuous shooting mode.

Processing in S51-S53 and S55 in the automatic continuous shooting mode is the same as that in S21-S23 and S25 in the automatic shooting mode shown in FIG. 10. Specifically, S54 related to the shooting and S56 related to the sending of the shot image are different from S24 and S26 in the automatic shooting mode shown in FIG. 10.

Specifically, in the shooting in S54, the shooting conditions are set relative to each of the detected particular subjects. First, an exposure value is calculated on the subject A, and a shutter speed for the subject A is determined based on the exposure value. The focusing is performed based on a distance measurement frame FA. Then, the shooting is performed under the exposure and distance conditions optimum to the subject A. The same processing is performed on the subject B, and the shooting is performed under the exposure and distance conditions optimum to the subject B. In this way, the shooting is continuously performed under the shooting conditions suitable for each of the identified subjects. As a result, images of the same number as the identified subjects are shot. The shooting conditions changed in accordance with the subject may include white balance, photographic sensitivity, zoom magnification, etc., as described above.

Then, in S55, the terminal devices 100 associated with the particular subjects are identified.

Then, in S56, the imaging apparatus 1 automatically sends the shot images to the terminal devices 100A and 100B, respectively, and notifies the terminal devices 100A and 100B of the event. At this time, the imaging apparatus 1 sends the image shot under the shooting conditions set relative to the subject A to the terminal device 100A, and sends the image shot under the shooting conditions set relative to the subject B to the terminal device 100B.

As described above, the imaging apparatus 1 includes the image sensor 4 configured to capture an image of the subject, the identification information storage unit 24 configured to store one or multiple particular subjects and one or multiple terminal devices 100 corresponding to the subjects, the face detection unit 21 and the face recognition unit 22 configured to detect the particular subject stored in the identification information storage unit 24 in the image captured by the image sensor 4, and the microcomputer 3 configured to send the image to the terminal device 100. The imaging apparatus 1 is configured to send the image to the terminal device 100. When the face detection unit 21 and the face recognition unit 22 detect the multiple particular subjects, the microcomputer 3 performs the shooting multiple times under different shooting conditions set relative to the detected particular subjects, respectively, and sends the images shot under the different shooting conditions to the terminal devices 100 which are stored in the identification information storage unit 24 and correspond to the particular subjects, respectively. Specifically, in the imaging system S including the single imaging apparatus 1 to which multiple terminal devices 100 are wirelessly connected, the shooting conditions are adjusted relative to each of the subjects identified by the imaging apparatus 1 to perform the shooting, and the shot images are automatically sent to the terminal devices 100 associated with the particular subjects, respectively, in the automatic continuous shooting mode. Thus, all the particular subjects can be shot under the suitable shooting conditions.

(10. Manual Shooting Mode of Alternative)

Figure 18:
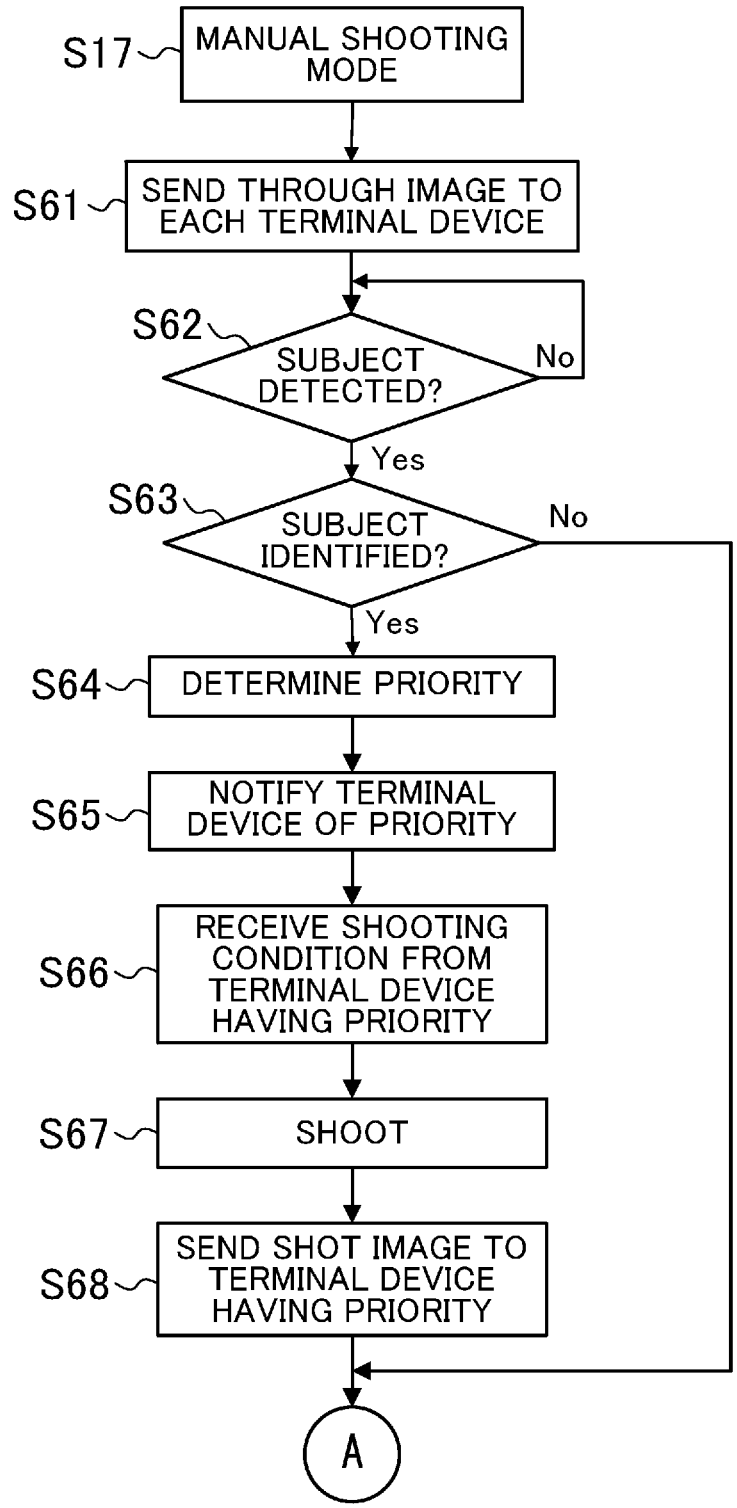
FIG. 18 is a flowchart of processing in a manual shooting mode according to the alternative.

A manual shooting mode according to an alternative will be described below. FIG. 18 is a flowchart of processing in the manual shooting mode according to the alternative. This mode may be referred to as a preferential manual shooting mode.

Processing in S61-S63 in the preferential manual shooting mode is the same as the processing in S21-S23 in the automatic shooting mode shown in FIG. 10. Specifically, the processing of sending the through image from the imaging apparatus 1 to each of the terminal devices 100, and performing the face detection on the through image to identify the subject is the same as that in the automatic shooting mode.

In S64, the imaging apparatus 1 determines to which terminal device 100 priority in performing the various operations is given. The preferentially performed various operations may be zooming, shutter operation, panning and tilting of the tripod 50, etc. The terminal device 100 to which the priority is given is determined based on the detected particular subject. Specifically, the imaging apparatus 1 gives the priority to the terminal device 100 corresponding to the detected particular subject. The terminal device 100 corresponding to the particular subject is identified by referring to the identification information table 25. When two or more particular subjects are detected, the imaging apparatus 1 determines one terminal device 100 to which the priority is given based on the order of priority of the particular subjects. For example, when an image shown in FIG. 11 is shot, the subjects A and B are detected as the particular subjects. Suppose that the subject A has a higher priority than the subject B, the priority is given to the terminal device 100A corresponding to the subject A. The order of priority of the subjects may be determined in advance using the identification information table 25 as described above.

When two or more particular subjects are detected, the terminal device 100 to which the priority is given may not be limited to a single terminal device. The priority may be given to two or more terminal devices 100 corresponding to the two or more particular subjects.

In S65, the imaging apparatus 1 notifies the terminal device 100A that the subject A is detected and the priority in performing the various operations is given. Then, the terminal device 100A is operable for performing the various operations. The imaging apparatus 1 does not notify the terminal devices 100B and 100C that the priority is given. Thus, the terminal devices 100B and 100C are prohibited to perform the various operations. Note that the terminal devices 100 may not be permitted or prohibited to perform the operations. For example, each of the terminal devices 100 may be allowed to output a command to perform the various operations, and the imaging apparatus 1 may handle only the command from the terminal device 100 to which the priority is given as a valid command, and may handle the commands from the other terminal devices as invalid commands.

In S66, the imaging apparatus 1 receives the shooting conditions from the terminal device 100A, and sets various shooting conditions. Specifically, the user sets the shooting conditions using the terminal device 100A. The setting of the shooting conditions can be done in the same manner as in S32. When the setting of the shooting conditions of the terminal device 100A is finished, the shooting conditions are sent from the terminal device 100A to the imaging apparatus 1. At this time, the terminal device 100A also sends the identification information thereof. Upon receiving the shooting conditions from the terminal device 100A, the imaging apparatus 1 determines whether the shooting conditions are sent from the terminal device 100 to which the priority is given based on the identification information. When it is determined that the shooting conditions are sent from the terminal device 100 to which the priority is given, the imaging apparatus 1 sets the sent shooting conditions as the shooting conditions thereof.

In S67, the shooting is performed. The shooting is executed when the user operates the terminal device 100A. The shooting operations are the same as in S33. Upon receiving a control signal, the imaging apparatus 1 determines whether the control signal is sent from the terminal device 100 to which the priority is given based on the identification information. When it is determined that the control signal is sent from the terminal device 100 to which the priority is given, the imaging apparatus 1 performs the focusing and the shooting based on the control signal. Thus, the manual shooting is performed under the exposure and distance conditions set by the terminal device 100A.

In S68, the imaging apparatus 1 automatically sends the shot image to the terminal device 100A to which the priority is given, and notifies the terminal device 100A of this event. Upon receiving the shot image and the notice, the terminal device 100A displays the shot image on the display 118A.

The shot image and/or the shooting conditions may be sent to the terminal devices 100B and 100C to which the priority is not given.

When the terminal device 100A relinquishes the priority, the priority of the terminal device 100A is canceled. The priority can be relinquished by operating the terminal device 100A. When the priority of the terminal device 100A is canceled, and the particular subject except for the subject A is shot, the priority may be determined again from the shot image of the particular subject.

Thus, the imaging system S includes the terminal device 100, and the imaging apparatus 1 which is configured to be remote-controlled by the terminal device 100, and to send the image to the terminal device 100. The imaging apparatus 1 includes the image sensor 4 configured to capture an image of the subject, the identification information storage unit 24 configured to store one or multiple particular subjects and one or multiple terminal devices 100 corresponding to the subjects, the face detection unit 21 and the face recognition unit 22 configured to detect the particular subject stored in the identification information storage unit 24 from the image captured by the image sensor 4, and the microcomputer 3 configured to notify the terminal device 100 which is stored in the identification information storage unit 24 and corresponds to the particular subject that the face detection unit 21 and the face recognition unit 22 detected the particular subject. When the face detection unit 21 and the face recognition unit 22 detect the particular subject, the microcomputer 3 accepts only the remote control by the terminal device 100 which is stored in the identification information storage unit 24 and corresponds to the particular subject. Specifically, in the remote imaging system S including the imaging apparatus 1 to which multiple terminal devices 100 are wirelessly connected, the priority for operating the imaging apparatus 1 is given to the terminal device 100 associated with the subject identified by the imaging apparatus 1 in the preferential manual shooting mode. Thus, the terminal device 100 which can perform the various operations of the imaging apparatus 1 is limited. This can avoid the imaging apparatus 1 from being out of control due to operation by the multiple terminal devices.

When the face detection unit 21 and the face recognition unit 22 detect two or more particular subjects, the microcomputer 3 accepts the remote control only by the terminal device 100 which is stored in the identification information storage unit 24 and corresponds to the particular subject having the highest priority among the detected particular subjects. Thus, the terminal device 100 which can perform the various operations of the imaging apparatus 1 can be limited to the single terminal device, and the imaging apparatus 1 can properly be remote-controlled.

(11. Imaging Apparatus and Terminal Device Joined Together)

Figure 19:
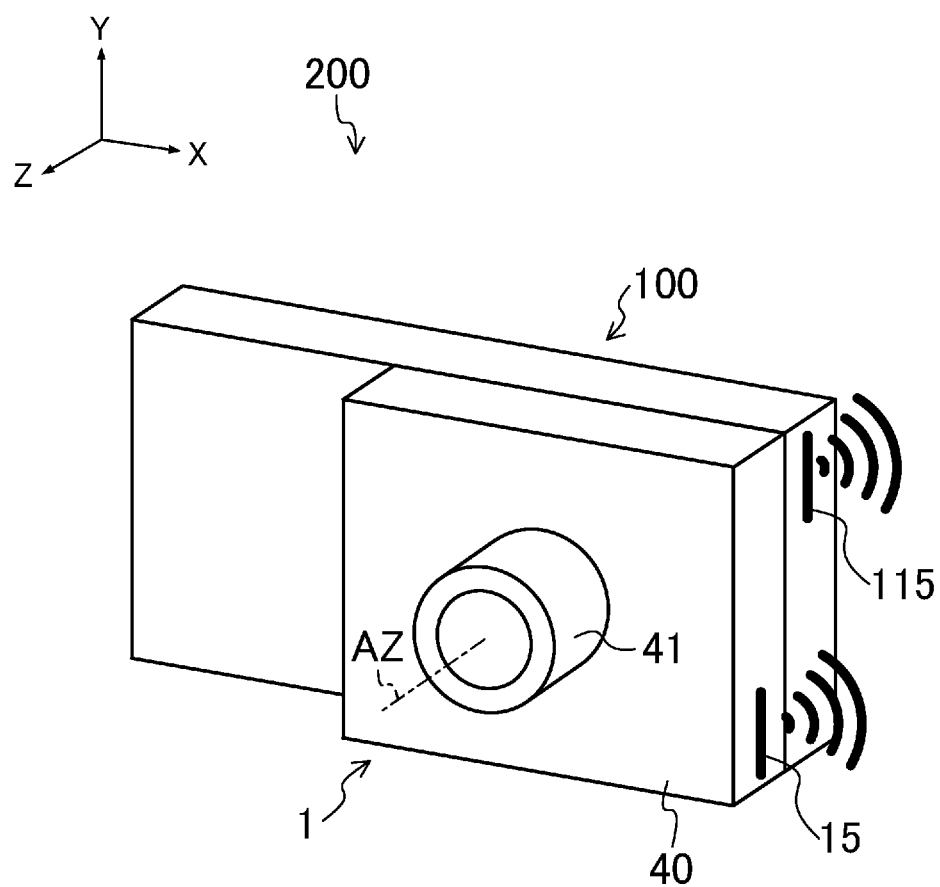
FIG. 19 is a perspective view showing appearance of an imaging apparatus and a terminal device joined in use.

The imaging apparatus 1 and the terminal device 100 joined in use will be described below. FIG. 19 is a perspective view showing appearance of the imaging apparatus 1 and the terminal device 100 joined in use.

The general configurations of the imaging apparatus 1 and the terminal device 100 have already been described with reference to FIGS. 2, 3, 6, and 7. Thus, the same components will be indicated by the same reference characters, and they are not described in detail again.

For example, a magnet is attached to a rear surface of the terminal device 100 (a surface opposite the display 118). Then, a rear surface of the imaging apparatus 1 (a surface opposite the lens barrel 41) is joined to the rear surface of the terminal device 100 through the magnet. The terminal device 100 includes the proximity sensor 17. Thus, the proximity sensor 17 detects a magnetic field of the magnet to detect that the imaging apparatus 1 and the terminal device 100 are joined. When the imaging apparatus 1 and the terminal device 100 are in proximity to each other, they are automatically P2P-connected. Thus, the imaging apparatus 1 and the terminal device 100 can easily constitute a display-equipped imaging apparatus 200. In the display-equipped imaging apparatus 200, the imaging apparatus 1 can be operated by operating the operation unit 131 of the terminal device 100. The through image and the shot image of the imaging apparatus 1 are sent to the terminal device 100 through the communication unit 15, 115, and displayed on the display 118, or recorded in the image recording unit 112.

As described above, the imaging apparatus 1 and the terminal device 100 can be used as a single imaging device 200 equipped with the display. Thus, the operation unit and the display required in general digital cameras can be removed from the imaging apparatus 1, or can be simplified. Accordingly, the imaging apparatus 1 can be downsized, and costs of the imaging apparatus 1 can be reduced. Since the smartphones and cellular phones are more useful in uploading or modifying an image processing software than the imaging apparatus 1, the usability can be improved.

The imaging apparatus 1 and the terminal device 100 are joined using the magnet attached to the terminal device 100. However, the imaging apparatus 1 and the terminal device 100 may be joined in different ways. For example, the imaging apparatus 1 and the terminal device 100 may be joined with a hook or a band. The proximity sensor of the imaging apparatus 1 detects that the imaging apparatus 1 and the terminal device 100 are joined. However, the detection is not limited thereto. For example, the terminal device 100 may have the proximity sensor, or the imaging apparatus 1 and the terminal device 100 may have the proximity sensors, respectively. Further, the joining of the imaging apparatus 1 and the terminal device 100 may not automatically be detected, but the user may input information that the imaging apparatus 1 and the terminal device 100 are joined.

Other Embodiments

The embodiment may be modified in the following manner.

The number of the terminal devices 100 included in the imaging system S is not limited to three. Any number of the terminal devices 100 may be included in the imaging system S.

The smartphone has been described as an example of the terminal device 100. However, the terminal device is not limited thereto. The terminal device may be an information terminal, such as a cellular phone, a tablet PC, etc. The type of the terminal device is not limited as long as the terminal device has particular identification information, and can be recognized by the imaging apparatus 1. Thus, the terminal device may be a television set or a personal computer for home use which is connected to the imaging apparatus 1 through an external communication device, such as an access point. Specifically, the imaging apparatus 1 can be remote-controlled by operating the television set or the personal computer for home use, and the shot image can be viewed in a large screen of the television set or the personal computer. When an application software for processing the shot image is installed in the terminal device, the application software can easily be upgraded, thereby improving convenience of the system. A camera may additionally be provided in the terminal device.

The particular identification information of the terminal device 100 is not limited to the Wi-Fi® address. Any information can be used as the identification information as long as the terminal device can be identified by the information. For example, the identification information may be a mail address or a phone number of the terminal device, or a character string selected by the user.

The digital camera has been described as an example of the imaging apparatus 1. However, the imaging apparatus 1 is not limited thereto. The type of the imaging apparatus is not limited as long as the apparatus can communicate with the terminal device, can identify the terminal device, and can associate the particular subject with the terminal device. Thus, any imaging apparatus can be used as long as it includes an optical system, an image sensor, a communication unit, and a storage unit. For example, the imaging apparatus may be a robot, a Web camera, or a surveillance camera. When the imaging apparatus is the robot, the robot can be remote-controlled by the triaxial gyro sensor and the triaxial acceleration sensor of the terminal device.

The image data is compressed and sent to the terminal device. However, the image data may be sent without compression. The shot image may be a still image (including continuously shot images), or a moving image.

The imaging apparatus 1 performs the face detection and identification of the subject. However, in place of the imaging apparatus 1, the terminal device 100 may perform the face detection and the identification of the subject. In this case, the terminal device 100 is provided with a face registration database similar to the face registration database 23. In this configuration, the through image is temporarily sent to the terminal device 100, and the terminal device 100 performs the detection and identification of the subject based on the through image. The terminal device 100 sends the results of the identification of the subject and the identification information to the imaging apparatus 1. Based on the results of the identification, the imaging apparatus 1 performs the exposure and the distance measurement described above. The shot image is also temporarily sent to the terminal device 100, and the terminal device 100 performs the detection and identification of the subject. The terminal device 100 sends the results of the identification of the subject and the identification information to the imaging apparatus 1. Based on the results of the identification, the imaging apparatus 1 sends the shot image and the shooting conditions described above. The image compression unit 10 may be provided not in the imaging apparatus 1, but in the terminal device 100.

The shot image is directly sent from the imaging apparatus 1 to the terminal devices 100. However, the sending is not limited thereto. For example, the shot image may be sent from the imaging apparatus 1 to a particular terminal device, and the shot image may be transferred to the other terminals from the particular terminal device.

The multiple terminal devices 100 are wirelessly connected to the single imaging apparatus 1. However, for example, the multiple terminal devices 100 may wirelessly be connected to multiple imaging apparatuses 1. When the terminal devices are connected to the multiple imaging apparatuses 1, the two or more imaging apparatuses 1 may simultaneously be controlled, a single subject may be shot from different locations, or the single subject may chronologically be shot. The number of the terminal devices 100 is not limited to three. For example, two terminal devices, or four or more terminal devices may be used.

A single subject is associated with a single terminal device 100. However, two or more subjects may be associated with the single terminal device 100. The subject to be registered is not limited to a person, and may be an animal such as a pet, a vehicle, etc.

The optical system L of the lens barrel 41 may be a single focus system or a pan-focus system. The imaging apparatus 1 may include an image stabilization device. The lens barrel 41 may be detachable from the camera body 40.

The electric pan head 51 including a motor may be installed not in the tripod 50, but in the imaging apparatus 1. The electric pan head 51 may be configured to automatically follow the subject in combination with the face detection unit 21 and the face recognition unit 22 of the imaging apparatus 1.

The operation unit 131, such as the shutter button 134, is provided on the display 118. However, the operation unit may be a mechanically operated button provided on the terminal device 100.

In the automatic shooting mode, the shooting is automatically performed when the particular subject is detected in the through image. However, a trigger for the automatic shooting is not limited to this event. For example, the automatic shooting may be performed at predetermined time intervals, or may be performed when a predetermined event has occurred, e.g., when the subject moves in a particular way. In this case, the imaging apparatus 1 detects the particular subject in the shot image. When the particular subject is detected, the shot image is sent to the corresponding terminal device 100 by referring to the identification information table 25.

In the manual shooting mode, when the particular subjects are detected, the terminal device 100 to which the priority is given is determined from the terminal devices 100 corresponding to the particular subjects. However, the giving of the priority is not limited thereto. The priority may be determined in advance irrespective of whether the particular subject is detected or not. Specifically, the imaging apparatus 1 can register multiple terminal devices 100, and the priority can be set together. Among the terminal devices 100 which are turned on, and in wireless connection with the imaging apparatus 1, the priority is given to the terminal device 100 having the highest priority. The terminal device 100 to which the priority is given can preferentially operate the imaging apparatus 1 irrespective of whether the corresponding particular subject is detected in the image or not.

In the manual shooting mode, the shot image and the shooting conditions are sent to the other terminal devices 100 than the terminal device 100 which performed the remote control. However, only the shooting conditions may be sent to the other terminal devices 100 without sending the shot image. In this configuration, the terminal devices 100 which received the shooting conditions set the received shooting conditions as their shooting conditions. Thus, the shooting conditions in the current situation can automatically be set.

The disclosed technology is useful for imaging apparatuses and imaging systems.

The above-described embodiment has been set forth merely for the purposes of preferred examples in nature, and is not intended to limit the scope, applications, and use of the invention. The specific configurations described above can be modified and corrected in various ways within the scope of the invention.

What is claimed is:

1. An imaging apparatus, the imaging apparatus comprising:
    an imaging unit configured to capture an image of a subject;
    a storage unit configured to store one or multiple particular subjects, and one or multiple terminal devices corresponding to the one or multiple particular subjects;
    a detection unit configured to detect the particular subject stored in the storage unit in the image captured by the imaging unit; and
    a control unit configured to, when the detection unit detects the particular subject in the image captured by the imaging unit,
        notify a corresponding one of the terminal devices which is stored in the storage unit and corresponds to the detected particular subject that the particular subject is detected, and
        send a real time image captured by the imaging unit to the corresponding one of the terminal devices,
    wherein the imaging apparatus is configured to be remote-controlled by the one or multiple terminal devices receiving the real time image from the imaging apparatus,
    wherein when the detection unit detects the multiple particular subjects, including a first particular subject and a second particular subject having a higher priority than the first particular subject, in the image captured by the imaging unit, the control unit is configured to accept remote control only by the terminal device which is stored in the storage unit and corresponds to at least the second particular subject.

2. The imaging apparatus of claim 1, wherein
    the control unit adds a frame surrounding the particular subject to the real time image sent to the terminal device.

3. The imaging apparatus of claim 1, wherein when the detection unit detects the first particular subject and the second particular subject in the image captured by the imaging unit, the control unit is configured to prohibit remote control by the terminal device which is stored in the storage unit and corresponds to at least the first particular subject.

4. The imaging apparatus of claim 1, wherein
    when the detection unit detects the first particular subject and the second particular subject in the image captured by the imaging unit, the control unit is configured to send a real time image with emphasis on the first particular subject to the terminal device corresponding to at least the first particular subject and send a real time image with emphasis on the second particular subject to the terminal device corresponding to at least the second particular subject.

5. The imaging apparatus of claim 1, wherein
    when the detection unit detects the first particular subject and the second particular subject in the image captured by the imaging unit, the control unit is configured to operate to obtain a shot image from the real time image based on one of shooting conditions corresponding to the second particular subject.

6. The imaging apparatus of claim 1, wherein
    the control unit is configured to give a right to perform a plurality of operations of the imaging apparatus to the terminal device corresponding to at least the second particular subject.

7. The imaging apparatus of claim 6, wherein
    the control unit is configured to notify that the terminal corresponding to at least the second particular subject is given the right.

8. The imaging apparatus of claim 6, wherein
    the control unit is configured to handle a command received from the terminal device corresponding to at least the first particular subject as an invalid command.

9. An imaging system comprising:
    a terminal device; and
    an imaging apparatus, wherein
    the imaging apparatus includes:
        an imaging unit configured to capture an image of a subject;
        a storage unit configured to store one or multiple particular subjects, and one or multiple terminal devices corresponding to the one or multiple particular subjects;
        a detection unit configured to detect the particular subject stored in the storage unit in the image captured by the imaging unit; and
        a control unit configured to, when the detection unit detects the particular subject in the image captured by the imaging unit,
            notify a corresponding one of the terminal devices which is stored in the storage unit and corresponds to the detected particular subject that the particular subject is detected, and
            send a real time image captured by the imaging unit to the corresponding one of the terminal devices,
        wherein the imaging apparatus is configured to be remote-controlled by the one or multiple terminal devices receiving the real time image from the imaging apparatus,
    wherein when the detection unit detects the multiple particular subjects, including a first particular subject and a second particular subject having a higher priority than the first particular subject, in the image captured by the imaging unit, the control unit is configured to accept remote control only by the terminal device which is stored in the storage unit and corresponds at least the second particular subject.

10. The imaging system of claim 9, wherein
the terminal device includes a display configured to display the real time image, and displays the real time image on the display upon receiving the notice and the real time image from the imaging apparatus.

11. The imaging system of claim 9, wherein
the control unit adds a frame surrounding the particular subject to the real time image sent to the terminal device.

12. The imaging system of claim 9, wherein
when the detection unit detects the first particular subject and the second particular subject in the image captured by the imaging unit, the control unit is configured to not accept remote control by the terminal device which is stored in the storage unit and corresponds to at least the first particular subject.

13. The imaging system of claim 9, wherein
when the detection unit detects the first particular subject and the second particular subject in the image captured by the imaging unit, the control unit is configured to send a real time image with emphasis on the first particular subject to the terminal device corresponding to at least the first particular subject and send a real time image with emphasis on the second particular subject to the terminal device corresponding to at least the second particular subject.

14. The imaging apparatus of claim 9, wherein
when the detection unit detects the first particular subject and the second particular subject in the image captured by the imaging unit, the control unit is configured to operate to obtain a shot image from the real time image based on one of shooting conditions corresponding to the second particular subject.

15. The imaging system of claim 9, wherein
the control unit is configured to give a right to perform a plurality of operations of the imaging apparatus to the terminal device corresponding to at least the second particular subject.

16. The imaging system of claim 15, wherein
the control unit is configured to notify that the terminal corresponding to at least the second particular subject is given the right.

17. The imaging system of claim 15, wherein
the control unit is configured to handle a command received from the terminal device corresponding to at least the first particular subject as an invalid command.

18. An imaging apparatus, the imaging apparatus comprising:
an imaging unit configured to capture an image of a subject;
a storage unit configured to store one or multiple particular subjects, and one or multiple terminal devices corresponding to the one or multiple particular subjects;
a detection unit configured to detect the particular subject stored in the storage unit in the image captured by the imaging unit; and
a control unit configured to, when the detection unit detects the particular subject in the image captured by the imaging unit,
notify a corresponding one of the terminal devices which is stored in the storage unit and corresponds to the detected particular subject that the particular subject is detected, and
send a real time image captured by the imaging unit to the corresponding one of the terminal devices,
wherein the imaging apparatus is configured to be remote-controlled by the one or multiple terminal devices receiving the real time image from the imaging apparatus,
wherein when the detection unit detects the multiple particular subjects, including a first particular subject and a second particular subject having an higher priority than the first particular subject, in the image captured by the imaging unit, the control unit is configured to prohibit remote control by the terminal device which is stored in the storage unit and corresponds to at least the first particular subject.

* * * * *